United States Patent
Kraus et al.

(10) Patent No.: US 12,554,705 B2
(45) Date of Patent: Feb. 17, 2026

(54) USER INTERFACE MODELS PROVIDING DYNAMIC ANALYTICAL CAPABILITY

(71) Applicant: SAP SE, Walldorf (DE)

(72) Inventors: Stefan Kraus, Bruchsal (DE); Dimitrij Raev, Biebesheim am Rhein (DE); Julian Frank, Mühlhausen (DE); Joerg Franke, Bruchsal (DE)

(73) Assignee: SAP SE, Walldorf (DE)

( * ) Notice: Subject to any disclaimer, the term of this patent is extended or adjusted under 35 U.S.C. 154(b) by 232 days.

(21) Appl. No.: 18/212,473

(22) Filed: Jun. 21, 2023

(65) Prior Publication Data

US 2024/0427760 A1    Dec. 26, 2024

(51) Int. Cl.
 G06F 16/242     (2019.01)
 G06F 16/2457    (2019.01)
 G06F 16/248     (2019.01)
 G06F 16/28      (2019.01)
 G06F 40/00      (2020.01)

(52) U.S. Cl.
 CPC .... *G06F 16/2423* (2019.01); *G06F 16/24573* (2019.01); *G06F 16/248* (2019.01); *G06F 16/283* (2019.01); *G06F 40/00* (2020.01)

(58) Field of Classification Search
 CPC .................................................. G06F 16/2423
 See application file for complete search history.

(56) References Cited

U.S. PATENT DOCUMENTS

| | | | |
|---|---|---|---|
| 9,501,585 B1 | 11/2016 | Gautam et al. | |
| 11,269,907 B1* | 3/2022 | Martino et al. | G06F 16/248 |
| 11,386,264 B2 | 7/2022 | Hofer et al. | |
| 12,039,348 B1 | 7/2024 | Kraus et al. | |
| 2008/0195649 A1* | 8/2008 | Lefebvre | G06F 17/30 |
| 2014/0074889 A1* | 3/2014 | Neels et al. | G06F 17/30424 |
| 2016/0259626 A1* | 9/2016 | Thattai et al. | G06F 8/10 |
| 2018/0046723 A1 | 2/2018 | Spatz | |
| 2018/0068005 A1* | 3/2018 | Vemuri et al. | G06F 17/30592 |

(Continued)

OTHER PUBLICATIONS

Li et al., "HiTailor: Interactive Transformation and Visualization for Hierarchical Tabular Data," Jan. 1, 2023, IEEE Transactions on Visualization and Computer Graphics, vol. 29, No. 1, pp. 139-148.

(Continued)

*Primary Examiner* — James J Debrow
(74) *Attorney, Agent, or Firm* — Klarquist Sparkman, LLP

(57) ABSTRACT

Techniques and solutions are provided for providing software application functionality allowing users to perform analytical data operations. Software applications typically limit users to interacting with predefined data. Disclosed techniques allow users retrieve new data, or process data in different ways, by accessing lower-level objects, such as analytic queries defined in a virtual data model. An object of a data model defined for a collection of graphical user interfaces can be used to identify an analytical data object providing access to data defined by the data model. A query is executed to retrieve data corresponding to at least a portion of attributes defined in the data model. At least a portion of retrieved data is displayed. User input is received that requests a pivot operation, an operation to add a filter, or to add a multidimensional data element of the analytical data object to the graphical user interface display.

20 Claims, 16 Drawing Sheets

(56) References Cited

U.S. PATENT DOCUMENTS

2019/0102442 A1\* 4/2019 Daga et al. ....... G06F 17/30569
2019/0317961 A1\* 10/2019 Brener et al. ......... G06F 16/906
2022/0147519 A1\* 5/2022 Martino et al. ....... G06F 16/248
2024/0427761 A1 12/2024 Kraus et al.

OTHER PUBLICATIONS

Gonzalez-Mora et al., "Model-Driven Development of Web APIs to Access Integrated Tabular Open Data," Jan. 1, 2020, IEEE Access, vol. 8, pp. 202669-202686.
Notice of Allowance received in U.S. Appl. No. 18/212,490, filed Mar. 18, 2024, 10 pages.

\* cited by examiner

FIG. 9

| FS Item | YR2024 | YR2023 | Change | %Change |
|---|---|---|---|---|
| Balance Sheet | 0.00 | 0.00 | 0.00 | 0.00 |
| Assets | 105580 | 80649 | 24930 | 30.91 |
| Current Assets | 82399 | 58568 | 23830 | 40.69 |
| Assets Type1 | 82397 | 58566 | 23830 | 40.69 |
| Assets Type2 | 2 | 2 | 0 | 0.00 |
| Non Current Assets | 23180 | 22080 | 1100 | 4.98 |
| Liabilities and Equity | -105580 | -80649 | -24930 | 30.91 |
| Liabilities | -60370 | -41762 | -18607 | 44.56 |
| Total Equity | -45209 | -38887 | -6322 | 16.26 |
| Not Assigned FS Item | -0.06 | 0.00 | -0.06 | 0.00 |

Sign-Adjusted Amount in Group Currency In EUR

Version: A10 (Actuals)
Fiscal Year: 2024
Posting Period: 3
Key Date: 31.03.2024

Page Filters
Dimension Filters
Consolidation Unit:
☐ ˅ ASIA
☐ S008
☐ S006
☐ ˅ EMEA
☐ S007
☐ Parent
☐ S002
☐ S005
☐ ˅ USA
☐ S004
☐ S003

Apply

USER INTERFACE MODELS PROVIDING DYNAMIC ANALYTICAL CAPABILITY

FIELD

The present disclosure generally relates to user interfaces that provide default information, but can be dynamically used to provide custom analytics.

BACKGROUND

Modern enterprise software applications are capable of collecting and processing vast amounts of data. However, making practical use of the data remains challenging. In some cases, making practical use of data can result from different formats in which data is stored. For example, transactional data can be stored in one database system, while summary data generated using the transactional data can be stored in another database system. In some cases, a single database system can store and process both types of data, but challenges can still arise, including because transactional data is typically stored in row format, while summary, or "analytical," data is often stored in column format.

Other difficulties can arise because of different sets of knowledge and needs of different users who may interact with data. For example, "practical" use of the data may be made by non-technical users, such as employees engaged in the operation of a business. These users may have a limited understanding of what data exists, how the data is stored, and how to access and process the data. Further, these users typically lack sufficient privileges to directly access data. More technical users may be involved in setting up database systems and data models for storing and processing data, including for providing access to data, but may have a limited understanding of how the data is to be used, and in any event are not the end users of the data, and so may have limited need to manipulate what data is displayed, or how data is displayed, in order to take action based on the data.

In many cases, specific "views" of data can be defined. In this case, a "view" can refer to software objects that are defined to retrieve particular data from particular sources, such as in accordance with a predefined query, where an end user may be able to specify some query parameters, such as filters and filter values to be used and applied. User interface screens can be defined to retrieve data and facilitate an end user's understanding of the data and interaction with the data, such as defining particular values to be displayed according to a particular layout.

One issue with the creation of such "views" is that they are typically statically defined, and the definition is typically hard coded and in a relatively technical format. Thus, end users may be limited in what data they can access, and it can be time consuming and cumbersome to define additional views. In addition, software applications may be limited in the types of data they can access. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for providing software application functionality allowing users to perform analytical data operations. Software applications typically limit users to interacting with predefined data. Disclosed techniques allow users retrieve new data, or process data in different ways, by accessing lower-level objects, such as analytic queries defined in a virtual data model. An object of a data model defined for a collection of graphical user interfaces can be used to identify an analytical data object providing access to data defined by the data model. A query is executed to retrieve data corresponding to at least a portion of attributes defined in the data model. At least a portion of retrieved data is displayed. User input is received that requests a pivot operation, an operation to add a filter, or to add a multidimensional data element of the analytical data object to the graphical user interface display.

In one aspect, the present disclosure provides a process of defining a data model object instance representing a collection of graphical user interface displays. From an instance of a first computing object type, definitional elements of an analytic query are read. The analytic query is configured to retrieve data from one or more database objects. User input is received that defines, selects, or modifies an analytical data object, the analytical data object being defined at least in part based on at least a portion of the definitional elements of the analytic query. User input is received defining one or more graphical user interfaces based at least in part on definitional elements of the analytical data object. The definitional elements of the analytic query and the definitional elements of the analytical data object are associated with fields of the one or more database objects. An instance of a model object definition including the definitional elements of the analytical data object and definitions of the one or more graphical user interfaces is stored.

In another aspect, the present disclosure provides a process of displaying a graphical user interface display of an instance of a data model object representing a collection of graphical user interface displays. A request is received to view a page of a collection of graphical user interface displays. A data model defined for the collection of graphical user interface displays is determined. From an object in the data model, an analytical data object providing access to data defined by the data model is identified. A query is caused to be executed to retrieve data corresponding to at least a portion of attributes defined in the data model. Data retrieved in response to the query is received. At least a portion of the data retrieved in response to the query is displayed according to a default format specified in the data model. User input is received requesting, with respect to a first graphical user interface display of the collection of graphical user interface displays, (1) a pivot operation; (2) an operation to add a filter to be applied to the first graphical user interface display; or (3) an operation to add a multidimensional data element of the analytical data object to the first graphical user interface display.

In a further aspect, the present disclosure provides a technique of processing of query requests using a user interface query model using an analytical protocol and an analytic query. User input is received providing a query request requesting execution of a query associated with a user interface query model. The query request is converted to be executable using at least one analytical query model object. The query request is submitted in an analytical protocol to a virtual data model. The query request is converted to be used with an analytic query defined in the virtual data model. The query request is executed using the analytic query against a data store. Query execution results are returned to a user interface layer associated with the user interface query model in response to the executing the query request.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 7-9 are example user interface screens illustrating how a user can modify default definitional elements of a booklet model, such as to provide customized data analytics.

DETAILED DESCRIPTION

Example 1—Overview

Figure 1:
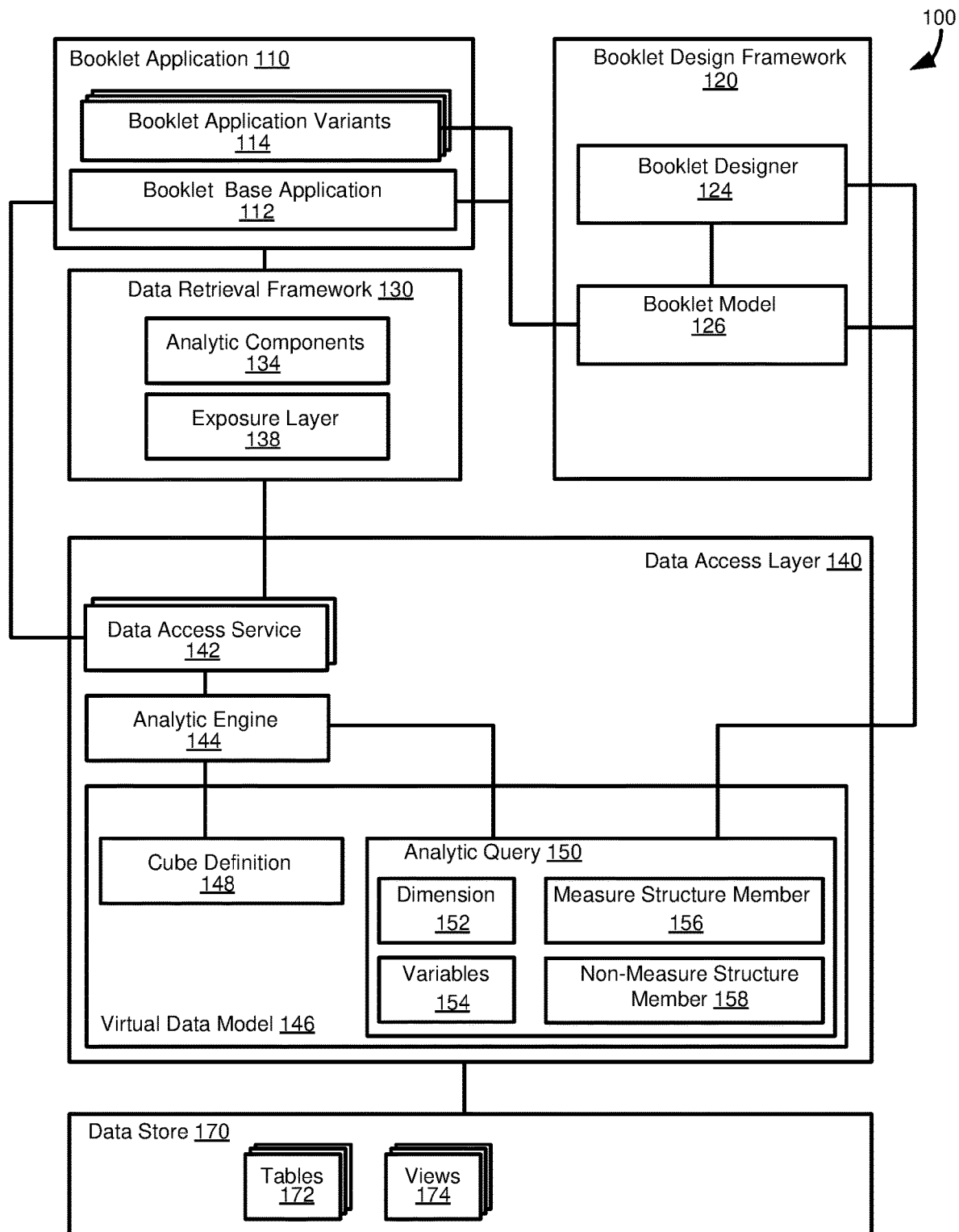
FIG. 1 is a diagram illustrating a computing environment for implementing disclosed technologies, including booklet functionality that provides both guided data presentation and custom analytics, and a data access arrangement that facilitates the use of analytical data protocols, and where an application can use both analytical and transactional data protocols in certain implementations.

Modern enterprise software applications are capable of collecting and processing vast amounts of data. However, making practical use of the data remains challenging. In some cases, making practical use of data can result from different formats in which data is stored. For example, transactional data can be stored in one database system, while summary data generated using the transactional data can be stored in another database system. In some cases, a single database system can store and process both types of data, but challenges can still arise, including because transactional data is typically stored in row format, while summary, or "analytical," data is often stored in column format.

Other difficulties can arise because of different sets of knowledge and needs of different users who may interact with data. For example, "practical" use of the data may be made by non-technical users, such as employees engaged in the operation of a business. These users may have a limited understanding of what data exists, how the data is stored, and how to access and process the data. Further, these users typically lack sufficient privileges to directly access data. More technical users may be involved in setting up database systems and data models for storing and processing data, including for providing access to data, but may have a limited understanding of how the data is to be used, and in any event are not the end users of the data, and so may have limited need to manipulate what data is displayed, or how data is displayed, in order to take action based on the data.

In many cases, specific "views" of data can be defined. In this case, a "view" can refer to software objects that are defined to retrieve particular data from particular sources, such as in accordance with a predefined query, where an end user may be able to specify some query parameters, such as filters and filter values to be used and applied. User interface screens can be defined to retrieve data and facilitate an end user's understanding of the data and interaction with the data, such as defining particular values to be displayed according to a particular layout.

One issue with the creation of such "views" is that they are typically statically defined, and the definition is typically hard coded and in a relatively technical format. Thus, end users may be limited in what data they can access, and it can be time consuming and cumbersome to define additional views. In addition, software applications may be limited in the types of data they can access. Accordingly, room for improvement exists.

The present disclosure provides a number of techniques that can be used to help address the issues noted above. The techniques can be used in combination, and the majority of the following discussion describes the use of the techniques in combination. However, the techniques may also be used separately. The disclosed techniques include a data access component for retrieving data to be manipulated and displayed, a framework for designing "booklets" that allow for the retrieval and visualization/display of such data, and user interaction with the data, and a designer that facilitates the development of such booklets.

While the disclosed techniques can provide a number of advantages, a significant advantage is that new data visualizations, the booklets, can be easily created, modified, and used, including by non-technical users, such as using a low code/no code approach. In part, these benefits can be achieved by automatically linking user interface controls and specific data to be retrieved/processed with components for retrieving such data. In a particular example, a "base" booklet application and corresponding booklet model can be initially provided. A particular user can then customize user interface screens provided through the booklet model to better suit their needs, such as by changing layouts or variable or filter values. The updated setting can be used to create a "variant" booklet application, including defining an updated/variant booklet model.

In another aspect, the present disclosure provides technologies that facilitate data retrieval. For example, a software application may be configured to obtain or manipulate data using a transactional data protocol. Disclosed technologies provide an exposure layer that facilitates applications in obtaining data using analytical data protocols. Obtaining data through analytical data protocols can allow a user to have more interaction with data, including to obtain insights from the data that would not otherwise be available.

Example 2—Example Computing Environment Facilitating Flexible and Dynamic Data Access or Manipulation FIG. 1 provides a high-level depiction of a computing environment 100 in which disclosed techniques can be implemented. The components of the computing environment 100 will be described in greater detail as the disclosure proceeds, but FIG. 1 provides a more holistic view that illustrates how the components can interact, as well as providing an orientation for the more detailed discussion that follows.

The computing environment includes a booklet application 110. Booklets, as well as techniques for defining and using booklets, will be defined in greater detail. In general, a booklet refers to one or more pages, where a page can represent a particular user interface screen, that are designed to assist a user in a particular process or task.

One example of a booklet is a review booklet, such as the Group Financial Statement Review Booklet available from SAP SE, of Walldorf, Germany. That booklet can include functionality/user interface screens for providing an overview of a group's financial statements, as well as benchmarking performance, or suggesting areas for improving performance. The booklet can involve extracting data from database tables or views, performing aggregations or calculations on the data, analyzing the data for a particular reporting structure or to provide particular key performance indicators (KPIs). The final "output" of the booklet can be a display of analysis results, such as according to a predefined or custom template. As will be further discussed, however, booklets described in the present disclosure have properties, and underlying technical implementations, that improve upon existing booklet technologies in a number of ways.

The booklet application 110 includes one or more base booklet applications 112. One or more booklet application variants 114 can be defined with respect to a given base booklet application 112.

The computing environment 100 also provides a booklet designer framework 120. The booklet designer framework 120 provides functionality to assist users in defining a base booklet application 112, or a booklet application variant 114. In particular, the user can employ a booklet designer 124 to create a booklet model 126. The booklet model 126 can then be processed by the booklet application 110 to provide booklet functionality to a user.

The booklet application 110 and the booklet designer framework 120 can use services provided by a data retrieval framework 130. The data retrieval framework 130 in turn can include analytic components 134 and components of an exposure layer 138. The analytical components 134 can include application programming interfaces (APIs), such as to access data associated with a multidimensional data model (such as an OLAP cube, or data equivalent to that provided using an OLAP cube). The analytical components 134 can also include functionality for creating reports, such as using data from the multidimensional model.

In a particular example, at least a portion of the analytical components 134 can correspond to SAP Analytics Cloud Data Foundation components, available from SAP SE, of Walldorf, Germany. SAP Analytics Cloud Data Foundation can provide data connectivity, such as to SAP HANA, SAP Data Warehouse Cloud, MICROSOFT EXCEL, GOOGLE SHEETS, or SALESFORCE data sources. SAP Analytics Cloud Data Foundation can also include functionality for creating data models, including relationships between various tables, views, and data sources, as well as creating calculated fields, hierarchies, and time dimensions, and also perform data transformations, such as data cleansing and data enrichment. Functionality to align or harmonize data from different data sources can also be provided by SAP Analytics Cloud Foundation, such as to account for different data structures, formats, or schemas in which data may be stored. Functionality for merging or aggregating data from different data sources can also be provided.

The exposure layer 138 can include functionality to interface with various data sources or data access services, including to define and manage queries, or to define or apply data analysis procedures. In particular, the exposure layer 138 can expose data sources that can be accessed using the Interactive Analytics (InA) data protocol of SAP, including to access data stored in the SAP HANA database system.

Requests for data, or information about data models, can be provided by a data access layer 140. For example, the data access layer 140 can have a data access service 142. In a particular example, the data access service 142 can be an InA service, including an InA service that provides access to multidimensional data. In other cases, as will be further described, the booklet application 110 can directly interact with a data access service 142, such as using a transactional data protocol.

The data access service 142 can interact with an analytic engine 144, where the analytic engine can provide runtime functionality for executing queries and analyzing or processing query results. In a particular example, the analytic engine 144 can be the Business Explorer (BEx) of SAP SE.

The queries executed by the analytic engine 144 can be performed with reference to a virtual data model 146. A virtual data model 146 can represent an abstraction of data stored in another data store, such as an abstraction of tables or views of a relational database system. Objects in the virtual data model 146 can be defined with respect to objects in a database, but can be more easily understandable and manipulable by users, particularly users with less technical knowledge. Examples of virtual data models include those implemented using Core Data Services (CDS) technology of SAP SE, of Walldorf, Germany.

A variety of objects can be present in the virtual data model 146, including a cube definition/object 148. The cube definition 148 can be used to generate an OLAP cube, or one or more data structures or data type instances that provide functionality analogous to an OLAP cube. For example, the cube definition 148 can include, or can reference, virtual data model objects forming a star or snowflake scheme.

The virtual data model 146 can further include an analytic query 150. An analytic query 150 can also be represented as a virtual data model object, such as a CDS view. The analytic query 150 can be defined with respect to the cube definition 148, including performing operations on data retrieved using the cube definition. The analytic query 150 can include dimensions 152, variables 154, measure structure members 156, and non-measure structure members 158. Dimensions 152 can represent fields (also referred to as attributes, which can correspond to columns of a database table or view, such as database tables 172 and database views 174 of a database 170) that describe "facts" represented in objects associated with the cube definition 148 (including in other database tables or views). For example, a particular sales order can have transactional data, such as an identifier of an item that was sold, and the sales order can be represented in a row of a table defined for such sales orders. Another table can provide details about various types of facts included in the sales order table. For instance, a dimension table may provide additional information about a product associated with a particular product identifier, such as a name of the product, a category of the product, a unit cost of the product, or a supplier of the product.

Variables 154 are parameters that can be used to filter the data based on certain criteria. They can be defined in the CDS view definition and can be used by the user when executing the query to specify the filter criteria. For example, a variable 154 can be used to filter data for a specific time period or a particular customer. Variables 154 can also be assigned values that can be used, for example, in calculations performed on/using data retrieved from a data source, such as the tables 172 or the views 174.

Measure structure members 156 are used to define particular metrics or calculations (where a measure structure member can be associated with a calculation, and a resulting value of the calculation can be provided through the measure structure member). Measures can also include key figures. An example of a measure structure member is a value, such as profit or revenue, whole value can be determined using an aggregation based on grouping criteria defined in a query. Measure structure members 156 can be defined in a CDS view definition and can be used in the query to perform calculations such as sums, averages, or counts.

Non-measure structure members 158 are used to define the grouping criteria for the data. They represent the dimensions or characteristics that are used to group the data and provide a structure for the output of the query. Non-measure structure members 158 can be defined in the CDS view definition and can be used in the query to group the data by different dimensions such as time, product, region, or customer. By combining these elements, users can define analytic queries that retrieve and analyze data from virtual data models, providing insight into different aspects of the business. Users can also create different variations of the same query by changing the variable values or selecting different measures or non-measure structure members, providing a flexible and powerful tool for data analysis and reporting.

Example 3—Example Booklet Application

Figure 2:
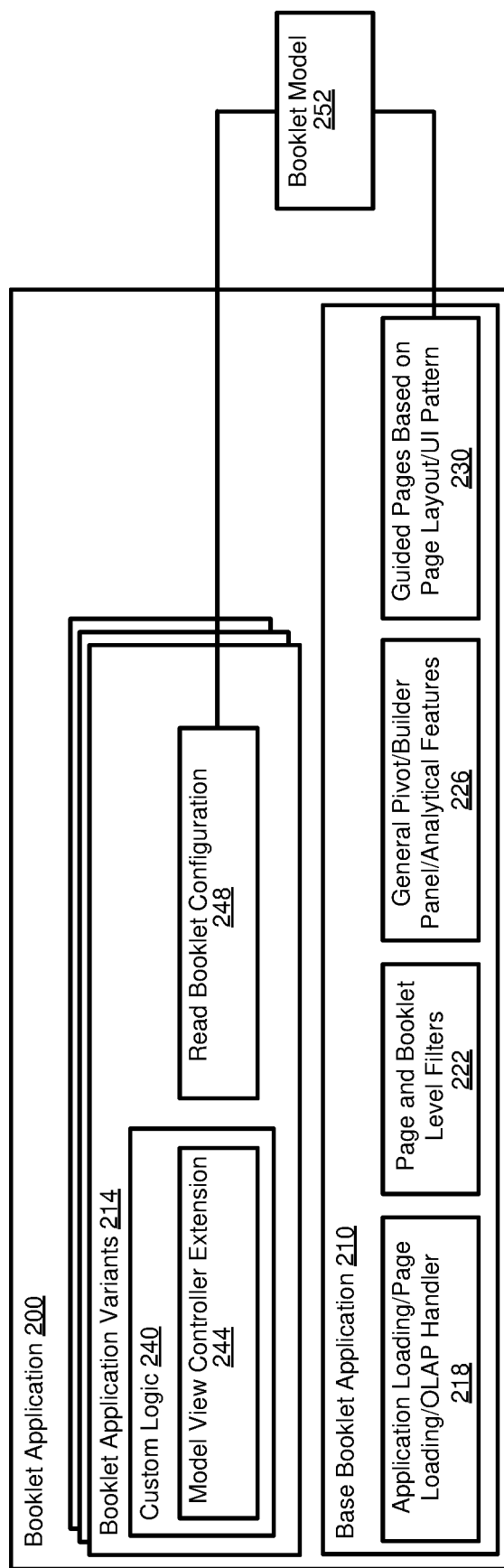
FIG. 2 is a diagram illustrating how a booklet application can have a base booklet application and application variants, which can be defined with respect to a booklet model.

FIG. 2 provides further details regarding the booklet application 110 of FIG. 1, shown in FIG. 2 as booklet application 200. The booklet application 200 can include a base, or foundation, booklet application 210. The base booklet application 210 provides a base set of functionality, which can be reused, including being extended or modified, in one or booklet application variants 214. In particular, the base booklet application 210 can include an OLAP handler 218. The OLAP handler 218 can be responsible to connecting to data sources, or requesting execution of queries on data sources, to provide data to be used by the base booklet application 210, or a booklet application variant 214. For example, referring back to FIG. 1, the OLAP handler 218 can communicate with components of the data retrieval framework 130.

In some cases, it can be desirable to filter data presented through the booklet application 200. Filtering can be performed using page and booklet level filters 222 of the base booklet application 210. Filtering can be performed in one or more ways. For example, filtering can be performed by assigning filter values to queries executed using, and results received from, the OLAP handler 218. In another example, data can be more "actively" filtered by the page and booklet level filters 222, such as by applying filters to data received from the OLAP handler 218.

As discussed above, a booklet can include multiple pages. Accordingly, filters can be defined for a booklet, and thus applying to all pages of the booklet, or can be defined for specific pages of a booklet. For any given booklet application 210, a combination of page and booklet level filters can be used, or only page level or only booklet level filters can be specified. In either case, filter values can be hardcoded for a particular base booklet application, or can be defined to dynamically receive specific values, such as based on user interaction with the booklet application 210 or a booklet application variant 214. That is, for example, a page level filter can be defined on a specific attribute (such as a dimension). When interacting with a page associated with the page level filter, a user can provide an actual filter value to be used with the filter.

The base booklet application 210 can include a component 226 that provides functionality for transforming or manipulating data. The component 226 can be programmed to perform "pivot" operations (or cause such actions to be performed), as well as user interface functionality that assists users in defining a pivoting (or other transformation) operation. As used herein, "pivoting" data can refer to transforming data between column and row formats. For instance, sales data may originally be stored as a column representing a product sold, a date the sale occurred, and amount of the product that was sold. A pivot operation can be used to transform the data to a table having a column for a sales date, and columns for different items that might have been sold on a given date.

Pivoting data can assist in summarizing data, such as performing calculations such as sums, averages, or counts. Pivoting data can also allow users to "slice and dice" data by organizing or filtering data using different criteria. For example, a pivot table can allow a user to view data aggregated at longer time periods (such as a quarter), and then expand a hierarchy associated with a date attribute to see the data summarized on a more granular level, such as months, weeks, or days.

The component 226 can also facilitate a user in switching between a "guided page" and a custom page, or an interface for generating a custom page, such as an interface that allows a user to define pivot/transformation operations. Guided pages can be implemented as in technologies available from SAP SE, of Walldorf, Germany, including in SAP Fiori, SAPUI5, and SAP Screen Personas. Generally, a guided page is a page that is designed to assist a user in completing a particular process, wherein a given guided page can be used with a given step of the process. Guided pages are often presented in a sequence, with, for example, data selection and entry options appropriate for a particular step in the sequence. Guided pages can also be associated with logic to check that data in a page is correct/valid, including generating a notification if a validation issue is determined.

The base booklet application 210 can include guided pages 230, which can be definitions of guided pages associated with the component 226, and which are generally rendered/processed by the base book application (or a booklet application variant 214). In at least some cases, guided pages can be based on particular page layouts or user interface patterns.

The booklet application variants 214 can include custom application logic 240, which can define additional application logic for the variant, as compared with the base booklet application 210. The custom application logic 240 can include a model view controller extension 244. That is, functionality of a variant can be implemented using the model-view-controller programming paradigm, where a model represents data and logic (such as business logic), the view represents the user interface, and the controller mediates interactions between the user interface/view and the model/data/logic. So, for example, the model-view-controller extension 244 can define additional data to be retrieved, displayed, or processed, the associated processing or display logic, and user interface elements to display data/receive user interactions with the functionality provided by the model extension.

A given booklet application variant 214 can include a component 236 to read configuration data for the application variant, such as from a booklet model 252. That is, the properties of a booklet application variant 214 can be defined in an applicant variant definition/model/configuration information. Having the information defining the booklet application variant definition being read in this way can provide a number of benefits, including making it easier for user to define or modify booklet application variants. That is, the configuration information can be specified via a user interface and saved. If the user decides to modify the booklet application variant 214, the configuration information can be easily modified. Thus, booklet application variants 214 can be defined using a low code/no code approach, and can be dynamically modifiable, since they are not "hardcoded."

Example 4—Example Booklet Data Model

Figure 3:
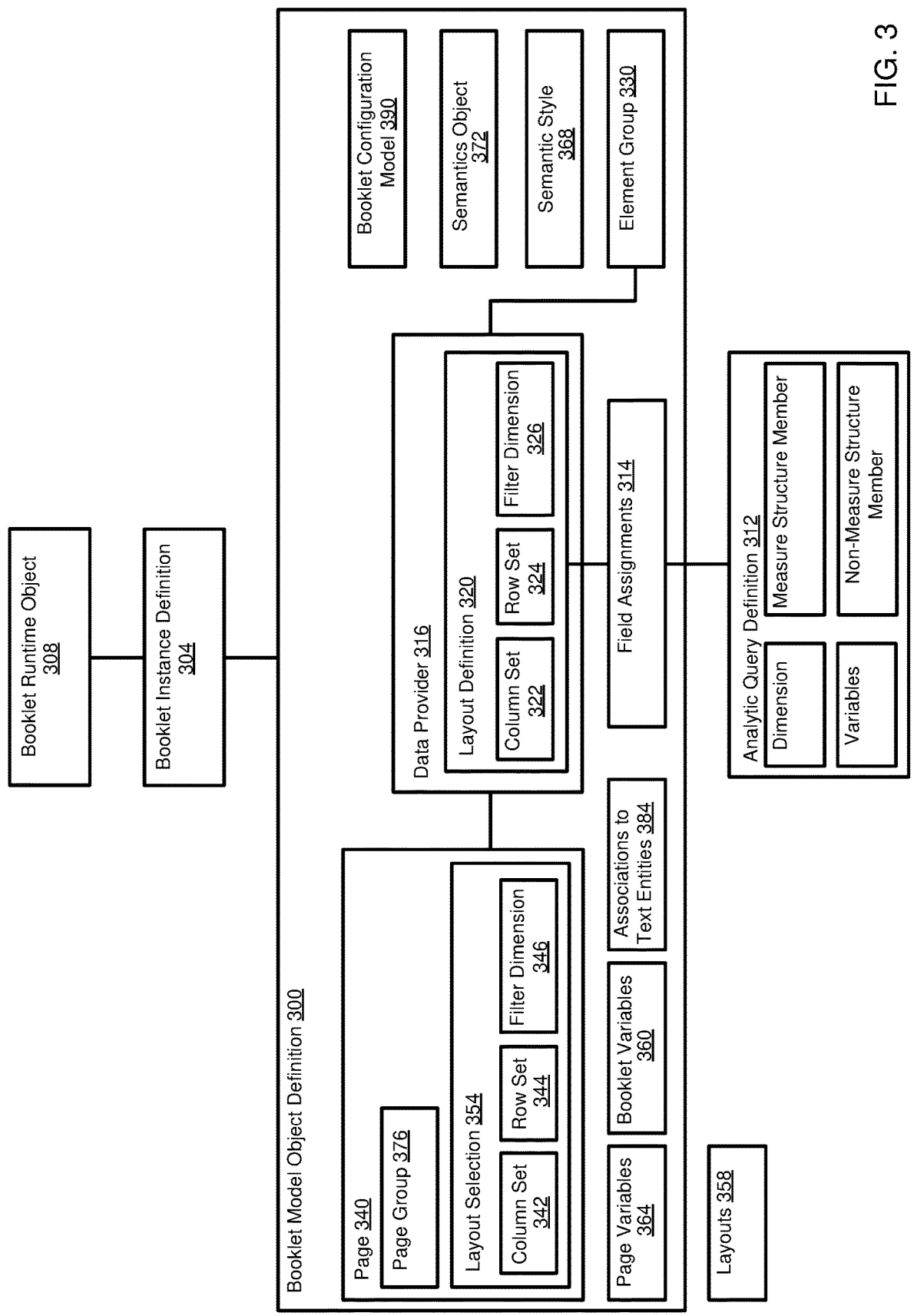
FIG. 3 is a diagram illustrating elements of a booklet model definition, and how a booklet model definition can be specified with respect to a definition of analytic query, and can be used to create definition of booklet instances, which in turn can be used to produce runtime objects.

FIG. 3 illustrates a booklet model object definition 300, which can be used to define specific booklet instances 304, which can in turn be realized as runtime objects 308.

In a particular example, elements of a booklet model object definition 300, whether for a "base" booklet or a booklet variant can be defined with respect to a query definition, which can correspond to the analytic query 150 of FIG. 1, and which is shown in FIG. 3 as analytic query definition 312 (such as an analytic query implemented as a Core Data Services (CDS) View, as in technologies of SAP SE, of Walldorf, Germany). The components of the analytic query definition 312 can correspond to the components 152-158 of FIG. 1.

Field assignments 314 can serve to map fields of objects in a virtual data model (such as the virtual data model 146 of FIG. 1) to fields in underlying database tables or views that store data associated with objects in a virtual data model, and can be used by the analytical query definition 312, which can itself be represented as an object in a virtual data model. Field assignments can be of different types, such as direct assignments, expression assignments, association assignments, projection assignments, or aggregation assignments, as those terms are used in CDS Views in technologies of SAP SE, of Walldorf Germany.

The analytic query definition 312, along with the field assignments 314, can be used to define a data provider 316 (a term used in SAP technologies, which is a type of analytical data model object, also referred to as an analytical data object), which can include a layout definition 320. The layout definition 320 can include columns sets 322, row sets 324, and filters 326, which can correspond to filters on a particular dimension of an OLAP object defined as, or with respect to, objects in a virtual data model (such as the cube definition 148 of FIG. 1).

The analytic query definition 312 and the data provider 316 illustrate how disclosed techniques both facilitate reuse of data objects, as well as creating booklets using a low code/no code approach. For example, an analytic query definition 312 can be used for a variety of other purposes, along with being used with a data provider 316 for a booklet. Thus, for example, booklets can leverage existing objects in a physical data model or a virtual data model. In addition, it can be seen how a single analytic query definition 312 can be used to define multiple data providers 316. Different data providers 316 can be created by selecting different columns, rows, or filters for a particular layout definition 320 of a given data provider.

In some cases, it can be useful to categorize or classify elements of a data provider 316, or of multiple data providers. These definitions can be stored as element groups 330. Specific examples of element groups 330 can be groups that include one or more column sets, row sets, filters, or combinations thereof.

Booklets can be constructed as sets of one or more pages 340. A page 340 can be defined with respect to particular components of one or more data providers 316. Thus, a given page 340 can include one or more column sets 342, one or more row sets 344, or one or more filters 346, where the columns sets, row sets, and filters can be subsets of the column sets 322, row sets 324, and filters 326. Typically, the column sets 342, row sets 344, and filters 346 are proper subsets of the column sets 322, row sets 324, and filters 326 (in other words the subset includes fewer elements than the overall set).

The elements of the column sets 342, row sets 344, and filters 346 can be displayed for a given page 340 according to a page layout 354, which can be selected from one or more available page layout definitions 358. Page layouts definitions 358 can represent predefined user interface templates, in a similar manner as how a presentation application (such as MICROSOFT POWERPOINT) can provide slide templates. So, for example, a given page layout definition 358 can be associated with elements, such as panels, for displaying particular types of information or user interface controls.

A panel may be set to display data of column sets and row sets in a tabular format, using particular labels associated with the column sets and row sets, and providing functionality such as scrolling through data or providing user interface elements to manipulate what data is displayed or how the data is displayed. The actual values used in an instance of a layout template 358 for a particular page 340 can be supplied using the selected column sets 342, row sets 344, and filters 346, which in turn are supplied by a data provider 316, and in turn as a result of executing an analytic query definition 312.

A booklet model 300 can also include booklet variables 360, page variables 364, semantic styles 368, and semantics objects 372. Booklet variables 360 and page variables 364 can represent variables to allow data to be shared between user interface controls and user interface elements in a booklet, or within a particular page 340 of a particular booklet. Booklet variables 360 and page variables 364 can be used to store filter criteria, page state information (such as state of particular user interface elements, such as whether a check box has been selected, or whether a collapsible section (such as a hierarchy) has been expanded or collapsed). Booklet variables 360 and page variables 364 can also be used to share data between user interface controls, such as sharing data between a table rendered for a page and a chart rendered using data from the table.

Semantic styles 368 can be implemented as discussed for the functionality 326 of FIG. 3. The semantics objects 372 can be similar to BusinessObjects, as implemented in technologies of SAP SE, of Walldorf, Germany. For example, a semantics object 372 can represent a sales order, and particular attributes or properties of a sales order (such as fields corresponding to fields of an object in a virtual or physical data model). Semantics objects 372 can be interrelated, and so a definition of one semantic object can include references to one or more other semantic objects. Actions can also be defined for semantics objects 372, such as creating a sales order, displaying an existing sales order, or changing the status of a sales order.

Pages can be assigned to page groups 376. For example, a booklet model instance 304 may be created for a particular process, with a series of related steps. A given step in the series may be associated with multiple pages, and thus a page group 376 can be defined for that step. Grouping pages 340 can be useful in guiding a user through an overall process, since all pages for a particular step of the process can be accessible to the user by simply selecting the appropriate page group 376.

The elements of the booklet model 300 have associations to text entities 384. For example, particular pages 340 or groups of pages 376 can be intended to guide a user through a specific process or subprocess, and can be associated with text that explains the process, the purpose of a page or page group, or how to manipulate or interpret displayed data. Text can also be associated through the associations 384 with page elements such as variables, row sets, column sets, filters, or particular user interface elements.

Information or definitional information for a booklet model 300 definition can be stored in a booklet configuration model 390. In a particular example, the booklet configuration model 390 stores information about pages 340 in a booklet model 300, and optionally page groups 376. Although the booklet configuration model 390 may be stored in any suitable format, in particular examples the format can be JAVASCRIPT OBJECT NOTATION (JSON) or XML.

Figure 4:
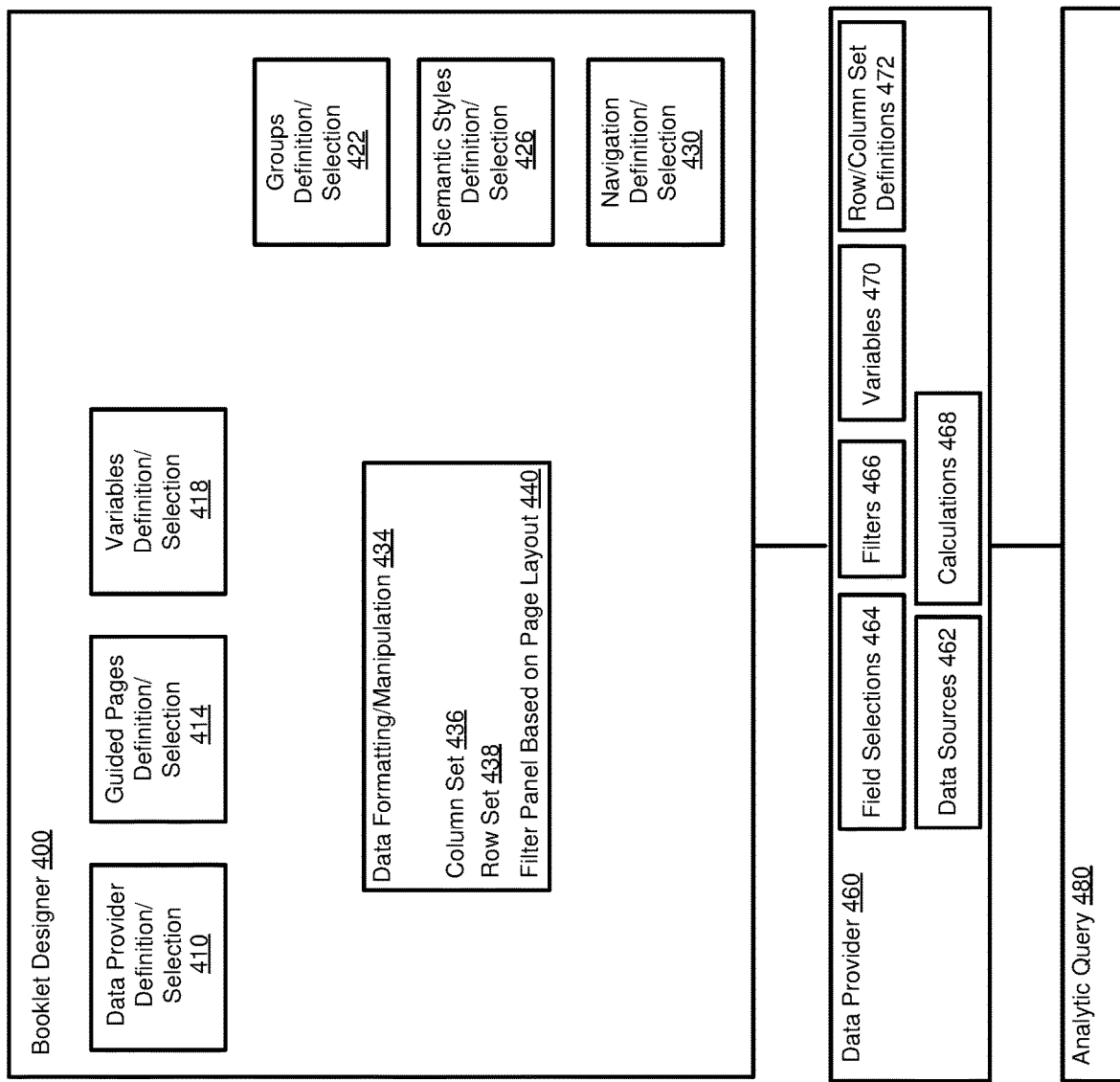
FIG. 4 is a diagram illustrating components of a booklet designer, and how the booklet designer can access information stored in a data provider, a type of analytical object, or an analytic query.

Example 5—Example Properties Configurable Using Booklet Designer and Data Sources for Use in Booklet Design FIG. 4 illustrates functionality provided by a booklet designer application 400, which can correspond to the booklet designer 124 of FIG. 1. The booklet designer application 400 can include functionality 410 to select or define data providers for use with a booklet, where a data provider can refer to functionality for obtaining data from a particular data source, and optionally performing processing on such data. For example, a data provider can perform actions such as filtering, sorting, aggregating, or joining data. In technologies provided by SAP SE, of Walldorf, Germany, examples of data providers include BW Queries (as used in SAP BUSINESS WAREHOUSE), or CALCULATION VIEWS, as used in SAP HANA.

The booklet application designer 400 can also include functionality to assist a user in selecting, defining, or modifying guided pages 414, variables 418, or groups 422. Guided pages can have the meaning as described in Example 3. Variables 418 can include variables used in filtering data. Groups 422 can refer to criteria used for grouping particular data in a base booklet application 210 or application variant 214 of FIG. 2.

The booklet application designer 400 can also including functionality 426 for selecting or defining semantic styles. Semantic styles can refer to particular user interface style, that both facilitates the creation of user interfaces, and helps maintain a consistent look and feel. For example, SAP's UI5 technology incudes sets of style classes that are based on the SAP FIORI design language. Style classes can include classes of user interface elements/controls to convey information that may indicate whether information is negative, neutral, or positive, or whether information presented (or action needed) is critical or urgent. As can be seen, the styles are defined to convey particular semantics to users, to help users understand the context and meaning of particular user interface elements, or data associated therewith.

As explained, booklets can be considered as a collection of views or screens (which can also be referred to as, or be part of, booklet pages) that are used together to guide a user through a particular task. Accordingly, the booklet application designer 400 can include functionality 430 for definition navigation options between views or screens. Again using the example of SAPUI5, navigation elements include a container that includes multiple views and allows navigation between the users using a built-in header or footer navigation bar (sap.m.App), a control that splits a screen into multiple areas and allows user to navigate between the areas using a navigation pane or master-detail interface (sap.m.SplitContainer), a control that displays multiple tables or sections, where a user can switch between the sections using a tab bar or swipe gesture (sap.m.TabContainer), or a control that lists actions or options that can be selected by a user.

The booklet application designer 400 can also include functionality 434 to define how data associated with a review booklet should be formatted, or provide options for manipulating/modifying data that is displayed. For example, functionality 436, 438 can be used to define data (such as based on particular attributes or sets of attributes) that corresponds to a column set or that corresponds to a row set.

In the context of the booklet applications and booklet models, row sets and column sets refer to the way data is organized and displayed in a table or grid control. A row set represents a set of data records that are displayed as rows in a table or grid. Each row typically corresponds to a single record in a data source, such as a database table or a web service response. The column set contains one or more columns, which represent the individual data fields or attributes of each record. A column set represents the set of columns that are displayed in a table or grid. Each column typically corresponds to a single data field or attribute of a record in a data source. The column set defines the properties of each column, such as the column width, alignment, and data type.

Row sets and column sets can be used together to display data in a structured and organized way. In SAPUI5, the sap.ui.table.Table control and the sap.ui.layout.Grid control support the use of row sets and column sets. Using row and column sets, can facilitate the display of large amounts of data in an organized and meaningful way. The definition of row sets and column sets can also be used to customize the appearance and behavior of the table or grid to meet the specific needs of an application, such as sorting, filtering, and grouping data.

The functionality 434 can also include functionality 440 that can be used to define a filter panel for the data, including a filter panel based on a particular page layout that has been selected. The filter panel 440 typically can be used to define criteria for data to be displayed a table (such as a table rendered using a table controller). That is, for example, the filter can be used to restrict rows in a row set to be displayed to those having particular values for particular columns in a column set.

As will be further described, the booklet designer 400 can access information in order to assist a user in creating a particular booklet instance, or particular pages of a booklet instance. For example, the booklet designer 400 is shown as accessing a data provider 460, which can correspond to a data provider 316 used in the booklet model object definition 300 of FIG. 3, or a data provider 640 that is discussed in conjunction with FIG. 6, or a data provider 1024 that is discussed in conjunction with FIG. 10.

Generally, the data provider 460 provides access to data, such as with reference to an analytic query 480. The analytic query 480 can correspond to the analytic query 150 of FIG. 1, the analytic query definition 312 of FIG. 3, or the analytic query 630 discussed in conjunction with FIG. 6. The data provider 460 specifies data sources 462 from which data can be retrieved, such as objects in a virtual data model. Field selections 464 and filters 466 can be used to restrict what data is received from a data source 462. The data provider 460 can specify calculations 468 that can be performed on data from a data source 462, while variables 470 can store values to be used in such calculations, or can be used to define filter criteria. A data provider 460 can also provide at least initial specifications of row set and column set definitions 472.

Figure 5:
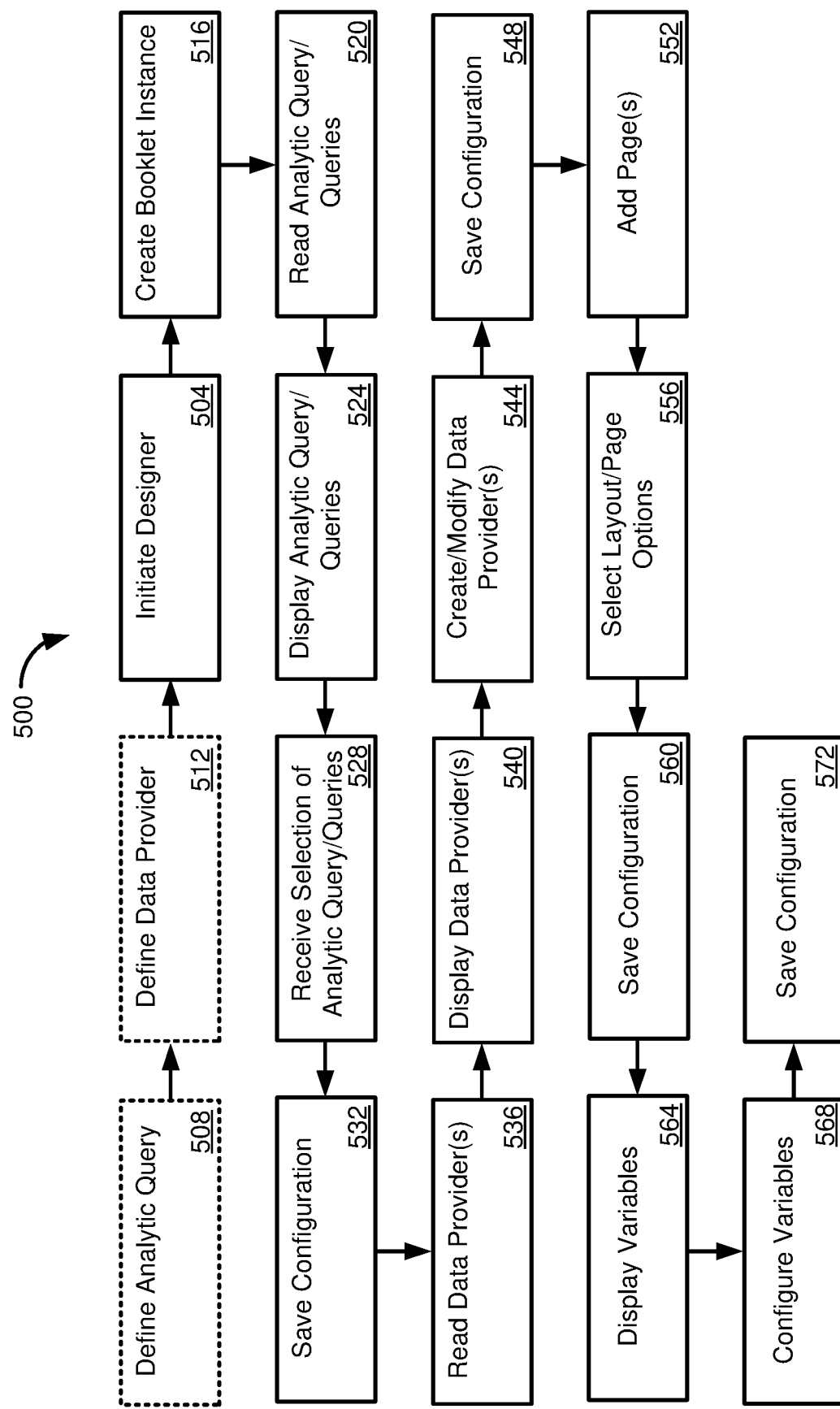
FIG. 5 is a flowchart of a process of defining a booklet model.

As explained in greater detail with respect to FIG. 5, the booklet designer 400 can access the information from the data provider 460 to define booklets and booklet pages, such as selecting from available data, filters, or variables defined by the data provider.

Example 6—Example Booklet Design Process

FIG. 5 is a flowchart of a process 500 for configuring a booklet model. The process 500 can represent an implementation of the use of the booklet designer 400 of FIG. 4, and can result in an instance of the booklet model 300 of FIG. 3. Generally, the process 500 includes reading elements of objects that can be used in constructing a booklet model, and presenting those options in user interface screens that guide a user in defining a booklet model, including particular pages of the booklet model.

The booklet designer can be initiated at 504. As described with respect to FIGS. 1-4, booklets, including booklet pages, can be defined with respect to an analytic query. At least in some implementations, the booklet designer assumes that one or more suitable analytic queries are available. If the analytic queries are not available, the analytic queries can be defined at 508. In further implementations, the booklet designer can include functionality to guide a user in defining an analytic query, or can include a link to other functionality to assist a user in defining an analytic query. For example, in software of SAP SE, of Walldorf, Germany, SAP ANALYTICS CLOUD provides an "Analytic Query Designer," which can be used to define or modify queries implemented as CDS views, HANA calculation views, or SAP BW queries. Other SAP tools for designing analytic queries include SAP HANA STUDIO and ABAP DEVELOPMENT TOOLS FOR ECLIPSE.

In some cases, the booklet designer assumes that data providers are available, or at least provides that existing data providers can be used by the booklet designer. Accordingly, data providers can be created at 512 prior to initiating the booklet designer at 504. The booklet designer can include, or can link to, functionality to assist users in defining or modifying data providers, such as SAP DATA SOURCE WIZARD. Other SAP tools for designing analytic data providers include SAP HANA STUDIO and ABAP DEVELOPMENT TOOLS FOR ECLIPSE.

After the booklet designer has been initiated, a booklet instance can be created at 516. For example, a user can enter a name for a booklet to be created, a description of the booklet, or whether the booklet is to be defined with respect to a "base" booklet, such as when a booklet variant is created. Creating a booklet instance at 516 can also include setting extensibility options for the booklet. For example, a given booklet can be "locked" so that it cannot be used for generating booklet variants, or only certain portions of the booklet can be locked. As an example, a user can select to limit modification to adding data providers or changing definitions of data providers, but may be restricting from adding or changing analytic queries associated with the booklet instance. Creating a booklet instance at 516 can also include generating and storing metadata for the instance, such as a date the booklet was created or an identifier of a user who created the booklet. Subsequent actions to modify a booklet instance can similarly be associated with metadata to list a date a last change was made and an identifier of a user who made the change.

If the booklet designer presumes the availability of pre-defined analytic queries, available analytic queries can be read at 520. Analytic queries that are available to be read can be limited by a particular application context or by a particular user identifier or user role. In some cases, options can be provided to define or modify analytic queries for use with the booklet being designed, including as described above. A selection of one or more analytic queries is received at 524, and is saved in configuration information for the booklet at 528.

At 532, available data providers are read (which can be implemented in a similar manner as described above with respect to reading analytic queries, where data providers associated with the selected analytic queries are read), and are displayed at 540. A user can then create or modify data providers at 544. In particular implementations, the operations at 536 and 540 are omitted, and data providers specific to the booklet instance being created are defined at 544.

Defining a data provider at 544 can include providing a name for the data provider, and identifying one or more analytic queries on which the data provider will be based. The user can then define or modify elements of the data provider at 544, such as row set definitions, column set definitions, or filters to applied to data from an analytic query used in defining the data provider. Elements of the data provider can be made available for selection based on properties of an underlying analytic query, such as by providing elements (such as attributes) of objects in a virtual data model that are embraced by the analytic query. After the data providers have been specified, the configuration information for the review booklet instance can be saved at 548.

Pages can be added to the booklet instance at 552. After a page is added, a layout and page options for the page can be selected at 556. When a page is added, it can be specified as a default page. It can also be specified whether the page will be visible. Pages can also be assigned to a page group. For example, a particular booklet may be designed to provide various types of financial information, and a group of pages may be defined specifically to present/process profit and loss information.

Adding a page at 552 can also include specifying particular information for the page, such as a page layout, a style, or options for arranging content. For analytical purposes, examples of page layouts include a single pivot table, a pivot table with a time series chart, a pivot table with a waterfall chart, a pivot table with a simple chart, a page merging data from two data providers, or a page showing data from two data providers with separate rows/columns for each data provider. As described, the layouts can act as predefined templates for particular data selected for use with a particular page.

Styles can include particular settings for display elements such as text fonts, text formatting (including coloring), iconography, and visual accents. Styles can also be used to define visual behavior of a page, such as actability to different screen sizes or device formats, or being optimized for a specific screen size or device format. In some cases, styles can be implemented using cascading style sheets. Content arrangement options can include arranging content horizontally or arranging content vertically. Additional types of content arrangement options can include stacked or nested arrangements, floating arrangements, overlapping arrangements, or gridless arrangements.

The operations at 552 can include defining content for the page. Defining content for a page can include selecting one or more data providers that were specified for use with the booklet at 544. Once data providers are selected, row sets, column sets, and filters may be defined for the page, which can include selecting a subset of available content from the data providers, or altering properties of the data provider. For example, the data provider may have some attributes specified as being column sets, and a page definition can instead cause the attribute to be specified as a row set. Once the page layout and options have been defined, the configuration can be saved at 560. The operations at 556 and 560 can be performed for each of multiple pages.

At 564 available variables can be displayed, and then configured by a user at 564. Variables, such as to filter, aggregate, or transform data, can be defined in one or more sources accessed by the query designer, such as a data provider, an analytic query referenced by a data provider, or virtual data model objects, such as CDS Views, that are referenced by the analytic query. Configuring the variables at 568 can include assigning a variable to a group, selecting whether a variable is visible on a page or not, changing whether a variable is mandatory, or providing default variable values. Variables can also be defined as being page level or booklet level. Once the variables are configured, the booklet configuration can be saved again at 572.

Figure 6:
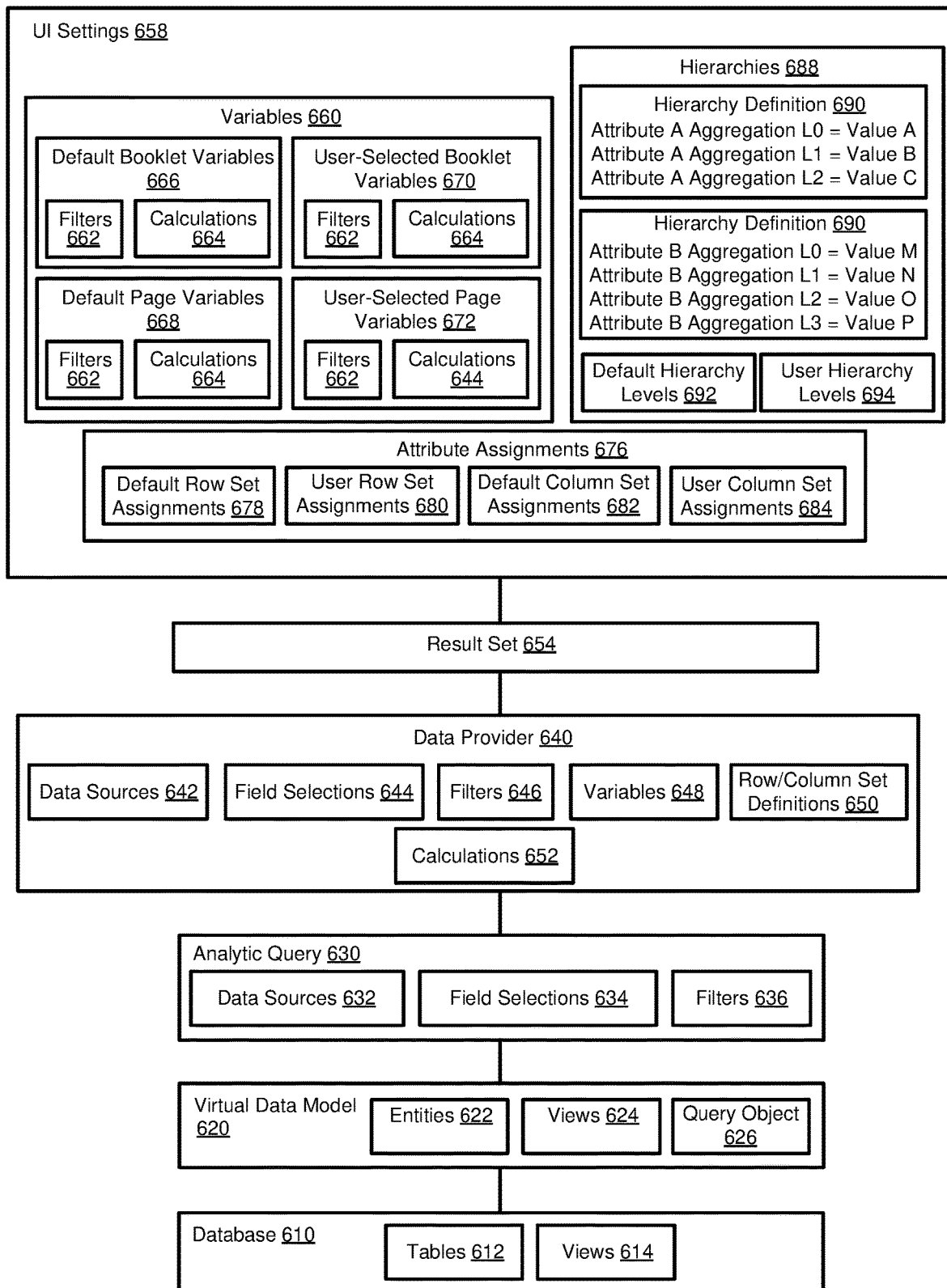
FIG. 6 is a diagram illustrating how data can flow from a data store to a user interface model, such as a booklet model.

Example 7—Example Booklet User Interface Components and Booklet Data and Metadata Sources FIG. 6 illustrates how data can flow from one or more sources in which the data is maintained to a user interface where data is displayed, along with various actions that can be taken with respect to the data at various stages. Generally, it can be considered that data available using objects of "upper" layers (such as the user interface, a booklet definition, or a data provider) is constrained by objects of "lower" levels. At least in some cases, objects at different layers can be specified with respect to one another such that an initial set of data, or data presentation options, in a default manner, and where a user can change what data is displayed or how data is presented, provided that the data is available at a lower layer.

In FIG. 6, a database 610 can serve as a "lowest" layer. Data can be stored in one or more tables 612, where a table has a particular definition, or schema, such as defining fields/columns for the table and relationships between tables. Data can also be stored in, or accessible through, one or more views 614. A view 614 can be a selection of data from one or more other views or tables 612. Data can be stored in a view 614, or data can be obtained during query execution from the underlying views/tables 612 of the database 610 when a query is executed. Thus, available data is constrained by tables 612 and views 614 in the database 610, data stored in another type of data store (such as an "object store"), or data stored in multiple data sources, either of the same general type or of different types.

A virtual data model 620 can reference the tables 612 and views 614 of the database 610, or one or more other data sources. For example, entities 622 or views 624 can be defined with respect to the tables 612 or the views 614. The virtual data model 620 can also include query objects 626. Query objects 626 can be, for example, CDS analytic views. The query objects 626 can reference the tables 612, views, 614, entities 622, or views 624, and perform various operations on the associated data. For example, a query object 626 can include measures, dimensions, and hierarchies, which can be used to organize and aggregate data. For example, a query object 626 can add calculated columns, which can have values that are based on performing calculations, including complex calculations, on data defined for a given query object with respect to entities 622 or views 624, or tables 612 or views 614.

The entities 622, views 624, and query objects 626 further restrict available data, since objects that reference those entities, views, and query objects will be limited to data of the tables 612 and views 614 that are referenced by the entities, views, or query objects (including through reference to other entities 622, views 624, and query objects 626), including through selection conditions, such as filters. However, the entities 622, views 624, and query objects 626 can also be thought of as creating data, such as through aggregation or calculation, although typically the created data can be considered as derived at least in part from other data that at some point originated from the database 610.

An analytic query 630 can correspond to one of the query objects 626, which in turn can correspond to the analytic query 150 of FIG. 1. For the purposes of FIG. 6, the analytic query 630 is shown as referencing particular data sources 632 (such as the tables 612, the views 614, the entities 622, the views 624, or other query objects 626). A definition of the analytic query 630 can include a selection of fields 634, which can correspond to a projection operation, of the data sources 632, as well as filters 636 to be applied to the fields of the data sources.

The analytic query 630 can serve as a data source for a data provider 640. Thus, data available to the data provider 640 is limited to data that can be provided by the analytic query 630, include as limited by the data sources 632 or field selections 634, in view of any filters that are defined for the analytic query, and in turn the definitions of such data sources. A data provider 640 can further limit data retrieved through the analytic query 630. For example, the data provider 640 can specify data sources 642 or field selections 644 that are a subset of the data sources 632 and the field selections 634. The data provider 640 can also include filters 646, which can be filters in addition to the filters 636, or which can be used to further restrict data filtered by a filter 636. That is, when filters 636, 646 are specified with respect to the same criteria, a filter 646 typically further limits data that is output after the application of the filter 636, but does not result in additional data being selected from the data sources 632.

The data provider 640 can also include definitions of variables 648 and row and column set definitions 650. Variables 648 can be used in performing various calculations 652 of the data provider, but can also serve as filters. That is, a value of a variable 648 that serves as a filter can restrict data that is made available from a result set 654 provided by the data provider 640. The row and column set definitions 650 can be used to specify what data (such as attributes, or combinations of attributes) will be displayed in row format and what data will be displayed in column format. That is, the row and column set definition 650 can be used to represent an initial "pivot" state, and then a user may perform pivoting operations to change different data between row and column formats, such as switching attributes between row and column formats.

A result set 654 is provided by the data provider 640. While all of the data from the data provider 640 can be provided in a user interface screen as provided by the data provider, in other cases it may be desirable to, at least by default, display a subset of the result set 654, or display data in a particular representation/format, including according to row set and column set definitions.

FIG. 6 also illustrates a variety of UI settings 658 that can be applied to the result set 654. At least some of the settings 658 represent default values, where at least some of the default values can be modified by a user. One UI setting type of the UI settings 658 can be for variables 660, which can correspond to variables of the variables 648, or can be additional variables defined for a booklet or page, provided that the data subject to a variable 660 is made available from a data provider 640, including being calculated or otherwise derived from such data.

The variables 660 can be defined at a booklet level (for example, applying to all pages in a booklet) or at a page level, and can be default variables (or more precisely, default values for particular variables, although in at least some cases variables may be considered as "inactive" if a value has not been assigned to the variable, which can be a default state). The variables 660 can also be of different types, as described for the variables 648, such as serving as a filter 662 or as a calculation variable 664. Thus, FIG. 6 illustrates the variables 660 as including default booklet variables 666, default page variables 668, user-selected booklet variables 670, and user-selected page variables 672.

In a similar manner, the UI settings 658 can be used to assign particular attributes (or sets of attributes) as rows or columns of a data presentation, which can then be modified by a user (corresponding to a request for a pivot operation), illustrated as attribute assignments 676. The attribute assignments 676 includes default row set assignments 678, default column set assignments 682, user row set assignments 680, and user column set assignments 684.

As explained with respect to FIGS. 1, 2, and 6, at least certain data can be associated with a hierarchy, such as a hierarchy that defines different levels of aggregation. A page or booklet can be associated with hierarchy information 688, which can include hierarchy definitions 690. The hierarchy definitions 690 can specify particular values for particular attributes that will cause a particular aggregation level for the attribute to be displayed. The hierarchy information 696 can also include default hierarchy levels 692, corresponding to an aggregation level that is initially displayed on a page. As a user interacts with a page, or upon selecting a control to modify a page layout, the user can choose a different aggregation level of one or more attributes, as shown for user-defined hierarchy level selections 694.

Example 8—Example Booklet Graphical User Interface Displays

Figure 7:
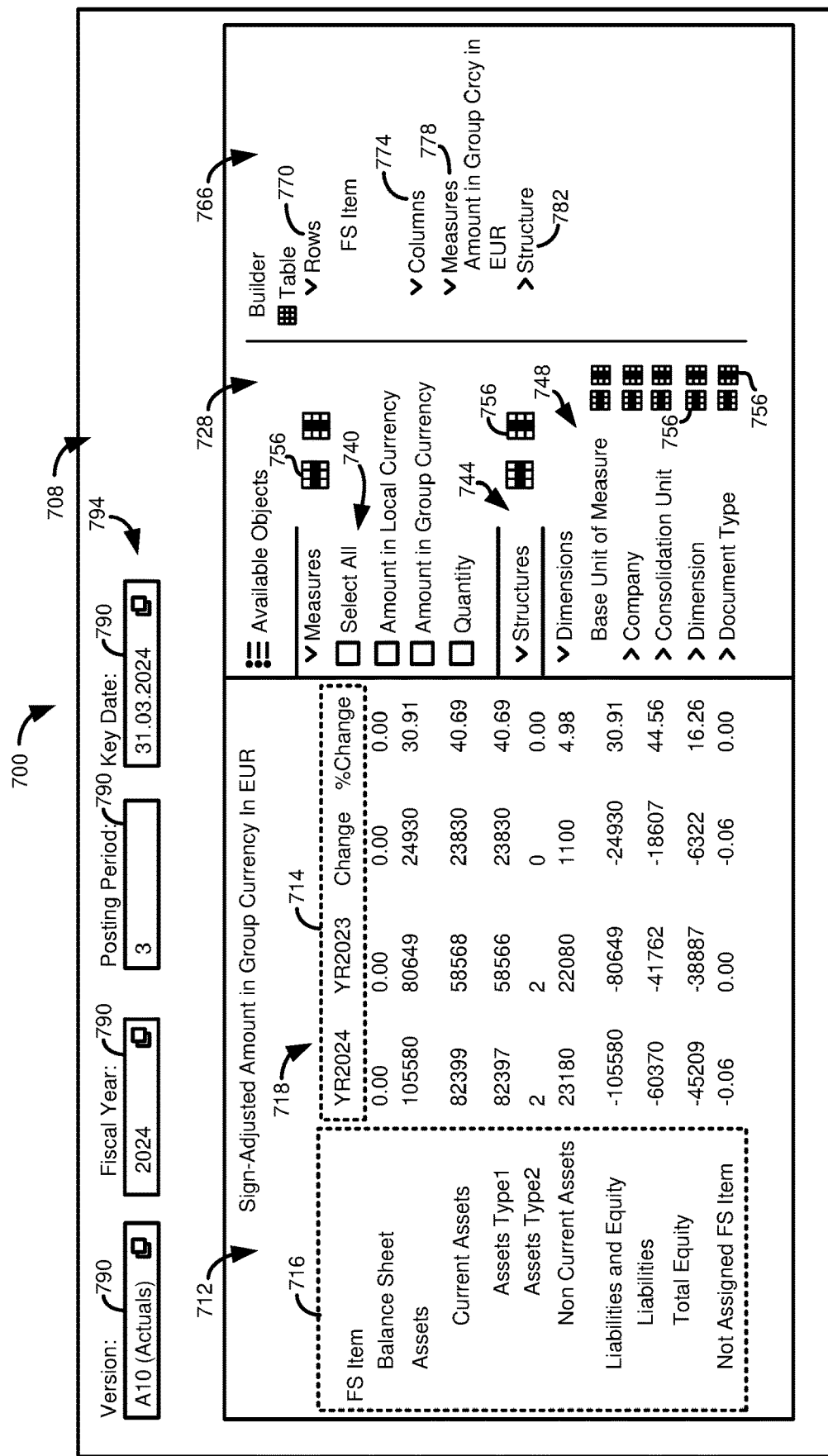

FIG. 7 illustrates an example user interface screen 700 that corresponds to a particular page 708 of a particular booklet. The page 708 can be a "guided page," such as having predefined row sets, column sets, and filters, which can be defined for the page using a booklet designer and then being saved in a page definition for a particular booklet model. Typically, guided pages are "static," in the sense that their capabilities, such as what data is displayed, how the data is displayed, and what types of actions are permitted for the data are hardcoded for a particular use case. In contrast, the page 708 can be adjusted dynamically by a user in various ways.

Consider first a panel 712 of the page 708. The panel 712 shows column sets 714 and row sets 716 defined for the page 708, where the data presented in a table 718 of the panel corresponds to values for the row sets for the particular columns in the column sets, after applying any filter values. However, the page 708 also includes a panel 728 that can be used to perform functions such as adding or removing data elements to be displayed, filtering data that is displayed, or performing pivoting operations (such as changing rows to columns, or vice versa).

For example, the panel 728 can show currently active measures 740, currently active structures 744, and currently active dimensions 748. "Measures" 740 can correspond to the meaning of that term in the field of OLAP technologies, such as amounts/metrics calculated from "facts" of OLAP data, where the facts are data points, such as numeric values or quantitative data being analyzed, as opposed to, for example, "dimensions" (including, for example, the dimensions 748), which can be categories or attributes that provide context for the facts, and which are used to "slice and dice" the data-such as viewing the data by country versus region, by product category or subcategories (or for all categories), or by different time periods (year, month, week).

Structures 744 can be collections of one or more elements such as variables, measures, dimensions, and facts. As an example, a structure may be defined for an "address," where the address includes attributes for first name, last name, street address, city, state, and zip code. In some cases, elements can be included as filters/grouping mechanisms on the level of structures 744, the level of an individual element of a structure (for example, a last name), or both.

Selecting or deselecting measures 740, structures 744, or dimensions 748 can cause data displayed in the panel to be updated. For example, deselection of a measure 740 can cause a particular measure to no longer be displayed in the panel 712. Or, the selection of a particular dimension 748 can cause data in the panel 712 to be aggregated in a different way.

The measures, 740, structures 744, and dimensions 748, as categories or as individual elements within a category, can be assigned to be displayed in row format or column format using UI elements 756. Selection of a UI element 756 can thus cause a pivot operation to be performed.

A builder panel 766 can include user interface elements to add or remove row sets or column sets, to change the composition of row sets or columns sets, or to change particular elements between row and column formats. Similar operations can be formed with respect to structures. For example, additional data elements (such as elements of a data provider/analytic query) can be added to a row definition section 770 or to a column definition 774, or existing data elements can be removed (although in at least some cases, the removal is temporary—not affecting the definition of the booklet/page). Dragging an item between the sections 770, 774 can cause a pivot operation to be carried out.

Columns can be added or removed using the column definition section 774 in a number of ways, including manually selecting columns from a data provider or selecting columns based on a classification, such as selecting columns designated as measures 778 or columns included in structures 782.

The panel 712 can display filter options 790 in a filter bar section 794. The filter bar 794 can allow a user to more quickly apply filters, as opposed to causing the panel 728 to be instantiated. Similarly, filter functionality can be provided in other ways, such as by "right clicking" a particular row or column.

A number of options can be provided in a user interface screen rendering booklet pages as described herein. For example, the user interface screen 700 includes the builder panel, while other user interface screens can allow a user to add or remove filters, such as specifying filter criteria. In particular, user interface screen 800 illustrates how a user can select particular filter attributes, while other user interface screens illustrate how a user can select particular values to be applied using a selected filter. Other user interface screens can provide other options to modify a page or information displayed on a page, such as changing a default page layout defined for the page, where selecting a different format can cause data associated with the page to be processed/re-rendered in the new layout.

Figure 8:
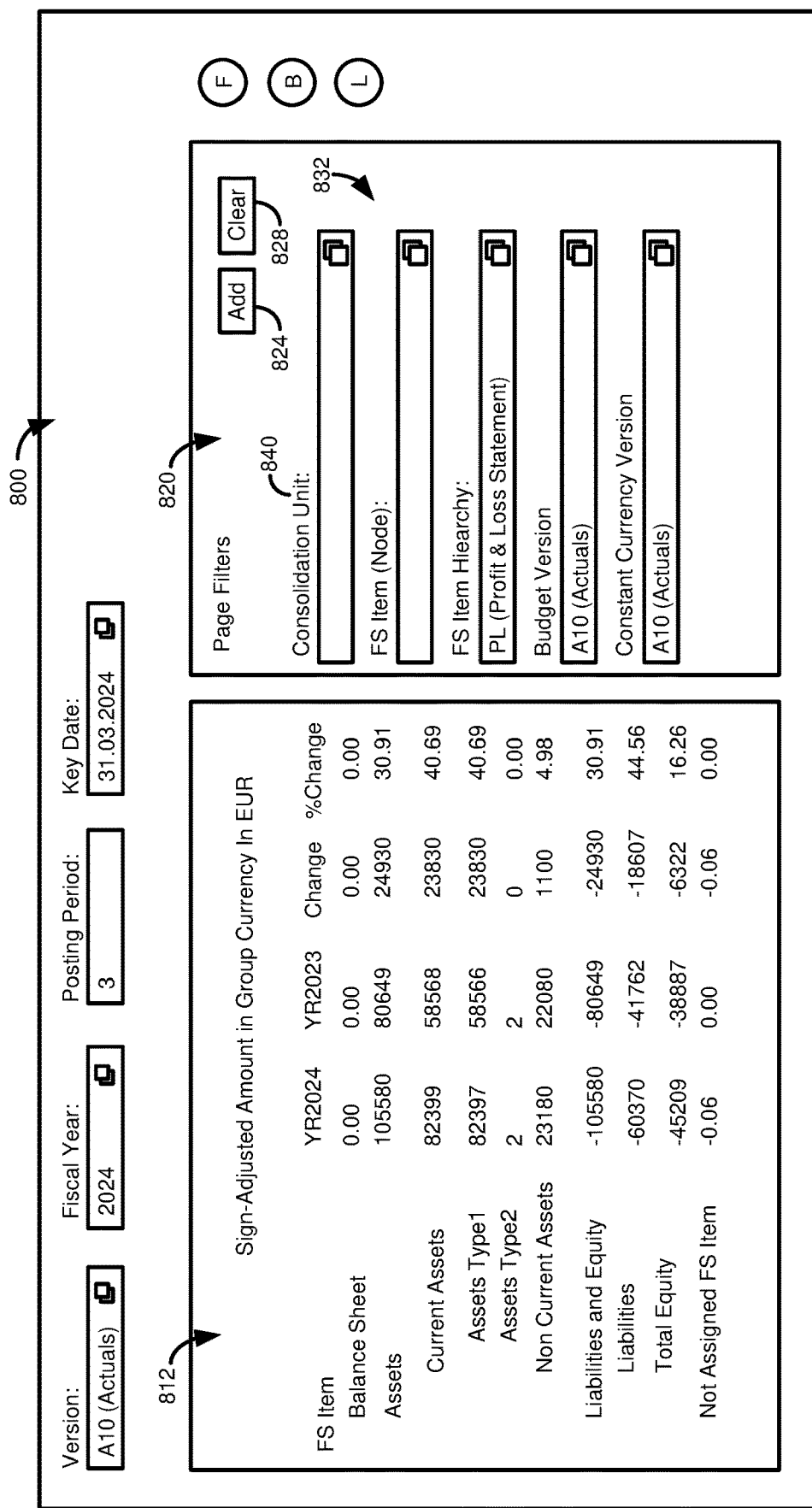

Turning first to the user interface screen 800 of FIG. 8, a panel 812 can be generally similar to the panel 712 of FIG. 7. However, instead of the builder panel 732, the user interface screen includes a filter selection panel 820. The filter selection panel 820 allows a user to set or clear filters that are active for a particular page, at least filters that have been made available for selection or modification according to a corresponding booklet or page definition. The user interface screen 800 includes a user interface control 824 to add a filter, and a user interface control 828 to clear active filters.

The panel 820 also lists various filter types 832 that can be applied to data presented in the panel 812, and which can be selected to define particular values to be applied for a given filter type. In particular, selection of the "consolidation filter" type 840 results in the generation of the user interface screen 900.

The user interface screen 900 of FIG. 9 presents a filter definition panel 910 that can be used to select values for a particular filter type. In particular, the filter definition panel 910 shows particular value categories 920, where a user can select an entire category or can instead select a particular value 924 with a category. The categories 920 and available values 924, at least in some cases, can be provided by a definition of a data provider or an analytic query on which the booklet/page is based.

Example 9—Example Data Access Framework

Figure 10:
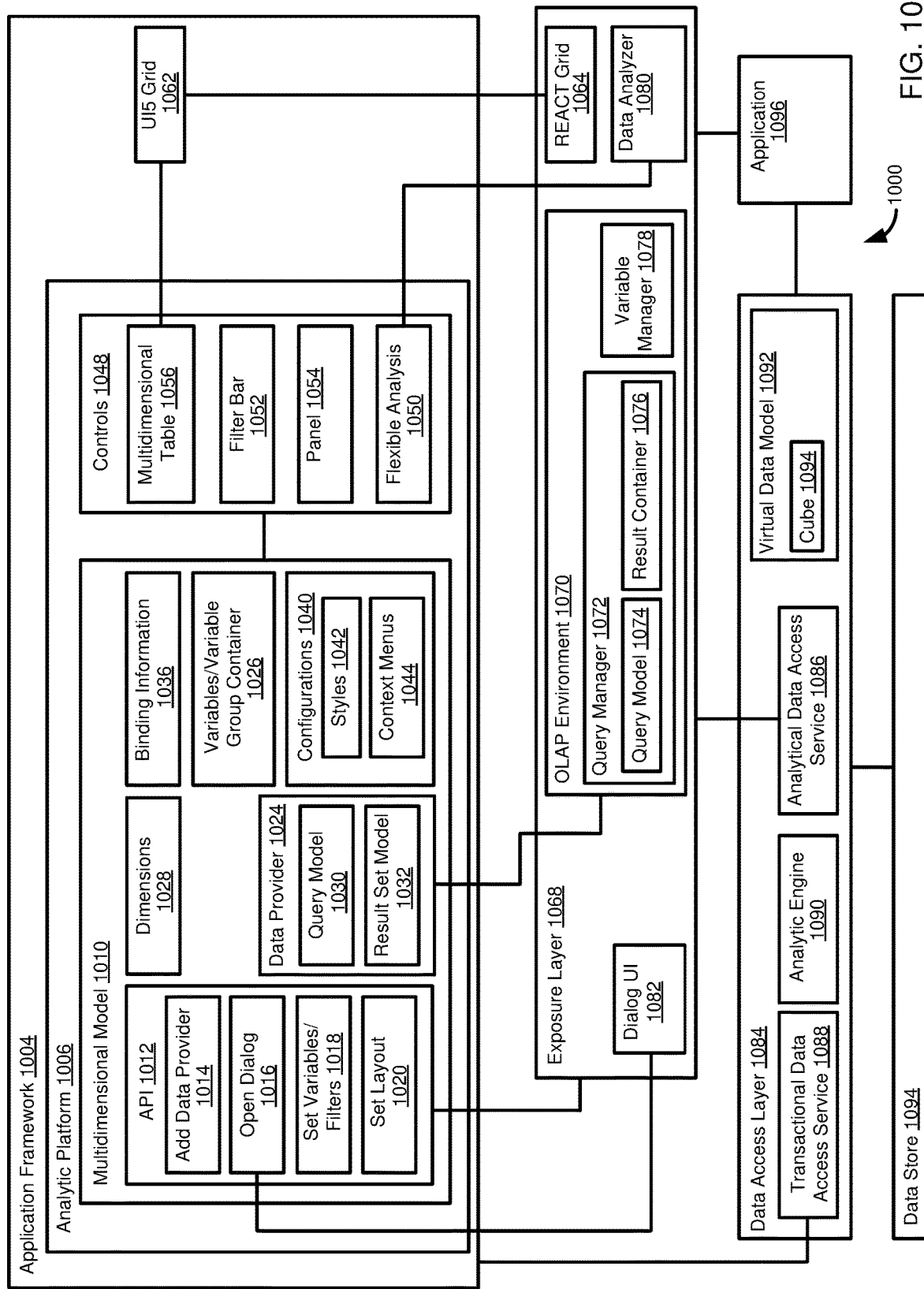
FIG. 10 is a diagram of an example computing architecture than can facilitate access to data using an analytical data protocol.

FIG. 10 illustrates a computing environment 1000 that can be used in implementing disclosed technologies. In particular the computing environment 1000 can represent components discussed in conjunction with FIG. 1, such as components in the data retrieval framework 130.

The computing environment 1000 includes an application framework 1004, which can be a web application framework. In a particular example, the application framework 1004 can be UI5, available from SAP SE, of Walldorf, Germany. Elements of the application framework 1004 can be implemented in an analytics platform 1006, such as SAP Analytics Cloud (SAC).

The application framework 1004 and the analytics platform 1006 can be used to generate and execute applications, such as web-based applications. In particular, the application framework 1004 and the analytics platform 1006 can implement applications using a model-view-controller (MVC) design pattern, where a controller connects user interface elements to an underlying data model.

The analytics platform 1006 can include a multidimensional model 1010, which can be implemented as a UI5 model (where UI5 is a technology available in products of SAP SE, of Walldorf, Germany). The multidimensional model 1010 can include a variety of components, including one or more application programming interfaces (APIs) 1012. The APIs 1012 can include methods to perform various actions in defining or using a booklet model, as described herein. For example, an API method 1014 can be used to add a data provider to a booklet model. API methods 1016, 1018, 1020 can be used, respectively, to open dialogs, set variables or filters, or to set a layout for a particular page of a particular booklet. Dialogs can include dialogs to filter data, change a page layout, or alter data being displayed in a page, or how the data is displayed, such as described in conjunction with FIGS. 3-9. A user may select a user interface control associated with a dialog API 1016. A dialog that involves setting variable or filter values can in turn use the API 1018, or a dialog associated with changing a page layout can use the API 1020.

The multidimensional model 1010 can also include data model objects, such as an object 1024 representing/providing a definition of a data provider, an object 1026 representing/providing a definition of variables or variable groups, or an object 1028 that represents/provides a definition of dimensions used with a particular multidimensional model. In turn, the data provider object 1024 can include a query model object 1030 and a result set model object 1032.

The query model object 1030 can represent a query useable to retrieve data from a backend data source (such as with reference to objects in a virtual data model that are in turn mapped to objects in a physical data model). The query model object 1030 can include properties and parameters such as filter, order, selection, and pagination parameters, where the filter, order, and selection parameters can be analogous to similar properties of SQL queries. The result set model 1032 can store data retrieved by a query, and can include methods to provide access to such data, such as to return actual result data (which can be returned, for example, as an array of JAVASCRIPT objects, where a given object can correspond to a particular record in a result set), to obtain a particular property value for a specific object/record of the result set, a method to get a total number of objects/records in a result set, or a method to obtain metadata associated with a result set, such as a number of objects/records that were returned by a data source in response to a query executed using a query model object 1030. In particular implementations, one or both of the query model object 1030 or the result set model object 1032 can be expressed as JSON (JAVASCRIPT OBJECT NOTATION) objects.

Binding information 1036 can be used to link data, including data in a result set model object 1032, or data associated with elements such as row sets, column sets, dimensions, measures, filters, or variables, with particular user interface controls. The multidimensional model 1010 can further include configurations 1040, such as styles 1042 used with a given instance of the multidimensional model or context menus 1044. Elements of the configurations 1140 can represent pre-defined user interface controls and design patterns, such as using technologies of SAP SE, including UI5 and SAP ANALYTICS CLOUD DATA FOUNDATION. Moreover, these components, as well as applications, including the booklet applications described herein, can be developed using an Integrated Development Environment, such as DRAGONFLY, also of SAP SE.

The analytic platform 1006 can include controls 1048 that can interact with elements of a model, such as the multidimensional model 1010, and user interface elements. Examples of controls include a flexible analysis control 1050, which can provide the functionality of the panel 766 of the user interface screen 700 of FIG. 7. A filter bar control 1052 can provide the filtering functionality 794 of the user interface screen 700.

A panel control 1054 can be used to provide a primary user interface panel, such as the panel 712 of FIG. 7. Various content can be placed in a panel, including content associated with additional controls. For example, a multidimensional table control 1056 can be used to control a multidimensional table displayed inside a panel controlled by the panel control 1054. Similarly, the panel control 1054 can provide options to specify filters or to provide filter values, such as described with respect to the user interface screens 800, 900 of FIGS. 8 and 9.

In a particular example, the multidimensional table control 1056 is pivot table control. That is, the multidimensional table control 1056 can include "standard" table control functionality, such as causing data to be displayed in a grid format in a particular user interface screen, including populating the grid with data (such as from a data provider 1024), and updating the screen as scrolling actions are performed, or as a display is resized. The multidimensional table control 1056 can also include pivot functionality, such as by transforming data between row and column formats/presentations. The multidimensional table control 1056 can include, or can reference, suitable functionality for performing such pivoting operations.

The multidimensional table control 1056 can be used with other grid functionality, such as platform grid components 1062, 1064. The platform grid components can include a pre-defined grid user interface component 1062, such as the UI5 Grid of SAP SE. Another example of a pre-defined grid user interface component is a REACT grid component 1064, which can use the REACT framework.

Data for use with the application framework 1004, and applications that use the application framework (such as the booklet applications described herein), can access data in different ways. In some cases, the nature of the access can depend on what type of data is being accessed, or what types of operations are being performed. For example, some protocols may be more optimized for use with analytical data and analytical operations, including for querying data and analyzing the resulting data. Other protocols may be more suitable for accessing data stored in a more transactional format, or performing operations that may be considered more "transactional" in nature, such as creating, updating, or deleting data (as opposed to analytical applications, which primarily involve reading data). The selection of a particular protocol can also depend on a layer of an object used to access the data, such as whether the object is an object in a physical database model or if the object is an object in a virtual data model. At least certain disclosed techniques can use multiple types of protocols, as shown in FIG. 10.

The computing environment 1000 includes an exposure layer 1068, which can also be referred to as an interface layer. The exposure layer 1068 can include components to provide access to analytical data protocols, such as the InA protocol of SAP SE. The exposure layer 1068 can provide an OLAP environment 1070. The OLAP environment 1070 in turn includes a query manager 1072. The query manager 1072 includes a query model object 1074 and a result container 1076. The query model object 1074 can format elements of the query model 1030 into a format that can be used with an analytical data protocol. For example, in a particular implementation, the query model 1030 can be defined using an ODATA/URL-based syntax for a query, while the analytical data protocol can use a JSON-based format. Similarly, the result container 1076 can be configured to receive results in one format, and provide the results to the analytic platform 1006 in another format. In a specific example, the result container 1076 receives results from the InA protocol as JSON objects, and those JSON objects can then be converted to JAVASCRIPT objects according to the result set model 1032.

The OLAP environment 1070 can further include a variable manager 1078, where the variable manager can maintain variable values, including for use in calculation or filtering operations, including for the purpose of providing values during query execution using the query model object 1074, or for data analysis performed by a data analyzer 1080 of the exposure layer 1068. The data analyzer 1080 can, for example, perform data analysis/transformation/manipulation actions requested using the flexible analysis control 1050.

The exposure layer 1068 can also include a dialog user interface component 1082. The dialog UI component 1082 can include controls and other UI elements for implementing dialogs associated with the multidimensional model 1010 (such as through the open dialog API 1016), which can be triggered by activating one of the controls 1048.

As mentioned, the application framework 1004, including the analytic platform 1006 and its components, can, at least in some embodiments, retrieve data, such as from a data access layer 1084, in multiple ways. As just discussed, the application framework 1004 can access data through the data access layer 1084 using an analytical data protocol, such as InA, using the exposure layer 1068. In particular, the exposure layer 1068, including components of the OLAP environment 1070, can communicate with an analytic data access service 1086 of the data access layer 1084, such as an InA service. The application framework 1004 can also access the data access layer 1084 using a transactional data access service 1086, with can be, in SAP technologies, a gateway using the SADL (Service Adaptation Description Language) protocol.

The data access layer 1084 includes an analytical engine 1090, which acts as a query processor, including accessing objects in a virtual data model 1092, including a definition of a cube 1094 (where the cube can be defined in a single object, such as with reference to multiple objects, or can be constructed from multiple objects without being separately defined). In turn, data associated with objects in the virtual data model 1092 can be obtained from a data store 1094, which can be a relational database system (in the context technologies of SAP SE, the database system can be a HANA database system).

While FIG. 10 has been described in conjunction with the booklet technologies described in the present disclosure, aspects of the computing environment 1000 can be used with other applications, represented as application 1096. Although shown as "outside" the application framework 1004, in some cases the application 1096 can be part of the application framework. The application 1096 can use the exposure layer 1068 to obtain data using an analytical protocol, and can also retrieve data through the data access layer 1084 using a transactional protocol. Typically, applications are configured to provide access to data through transactional protocols. Even if an application were configured to use an analytical protocol, an application may be limited to retrieving data using a transactional protocol or an analytical protocol, but not both. Aspects of the present disclosure thus facilitate providing applications access to data using an exposure layer 1068, and can also allow for applications that have access to data through both analytical and transactional protocols.

Example 10—Example Data Context

Figure 11:
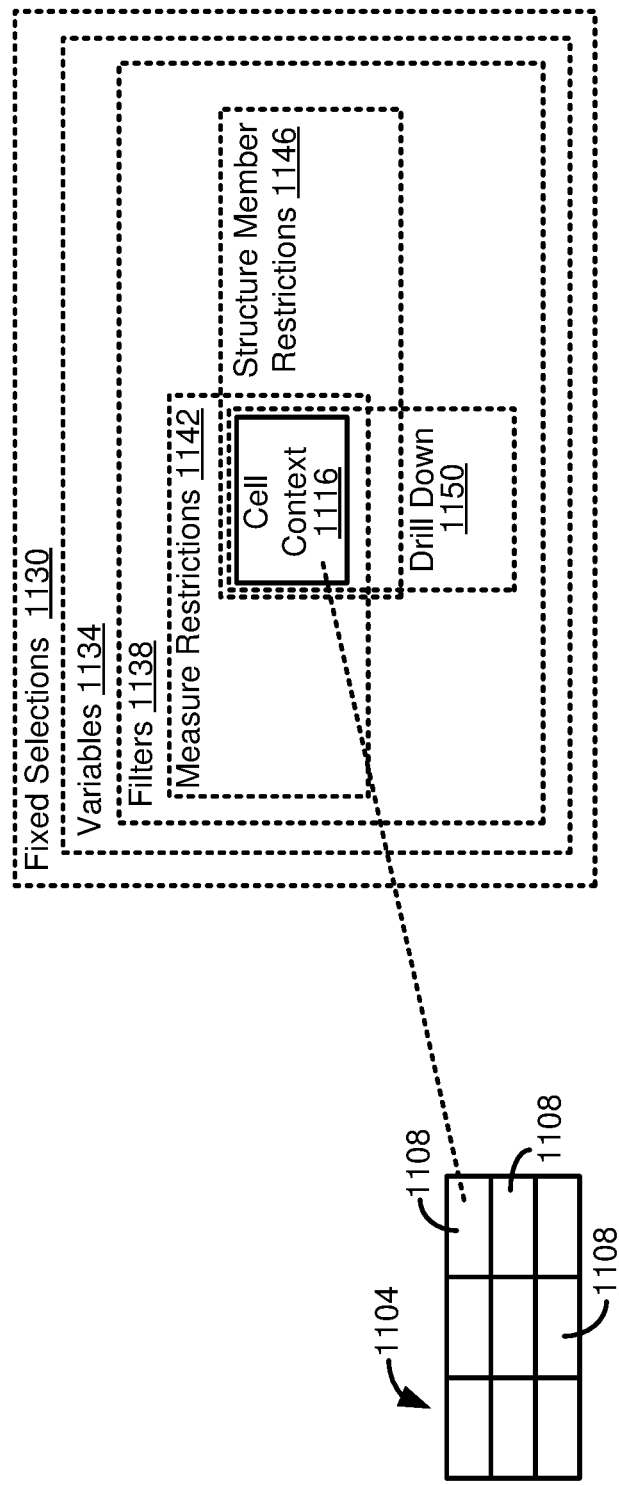
FIG. 11 is a diagram illustrating how components of analytical queries, data providers, and user interface models can provide a context to content displayed in a user interface, such as data displayed in a grid format in the user interface.

FIG. 11 illustrates how content displayed in a user interface can be determined using a particular context. In particular, FIG. 11 uses the example of content of cells 1108 displayed in a grid user interface element 1112. FIG. 11 illustrates a context 1116 for a particular cell 1108. In practice, all cells 1108 of the grid UI element 1112 can have the same context 1116, or different cells of the of the grid UI element can have different contexts.

The context 1116 can be considered as a hierarchical arrangement of, or at least a set of overlapping, definitions. For example, FIG. 6 described how different filters or variables could be applied by different layers that process data eventually displayed in a user interface, such as filers 636 of an analytic query 630, filters 646 or variables 648 of a data provider 640, or variables 666, 670, including filters 662, defined in user interface settings 650.

The context 1116 can include additional criteria that determines what data is displayed, or how data is displayed, such as using measure restrictions, structure member restrictions, or row or column set definitions, including as described in conjunction with FIGS. 3 and 7. Selection criteria can also include "slice and dice" functionality that may be specified in a data object, or specified interactively by a user. The context 1116 can also include settings such as page layouts and styles, including as discussed with respect to FIGS. 3-5 and 10.

Turning to the specific context 1116 illustrated in FIG. 11, the context includes fixed selections 1130, which can be, for example particular attributes and selection conditions specified in an analytical query. Variables 1134 and filters 1138 can select particular subsets of data to be displayed, or can affect how cell content is calculated (such as when the variable provides an input to a calculation). The filters 1138 can be of various types, including measure restrictions 1142 and structure member restrictions 1146. As described, drill down settings 1150 can also affect what content is displayed in a cell 1108, thus serving as part of the cell context 1116.

Example 11—Example Operations

Figure 12A:
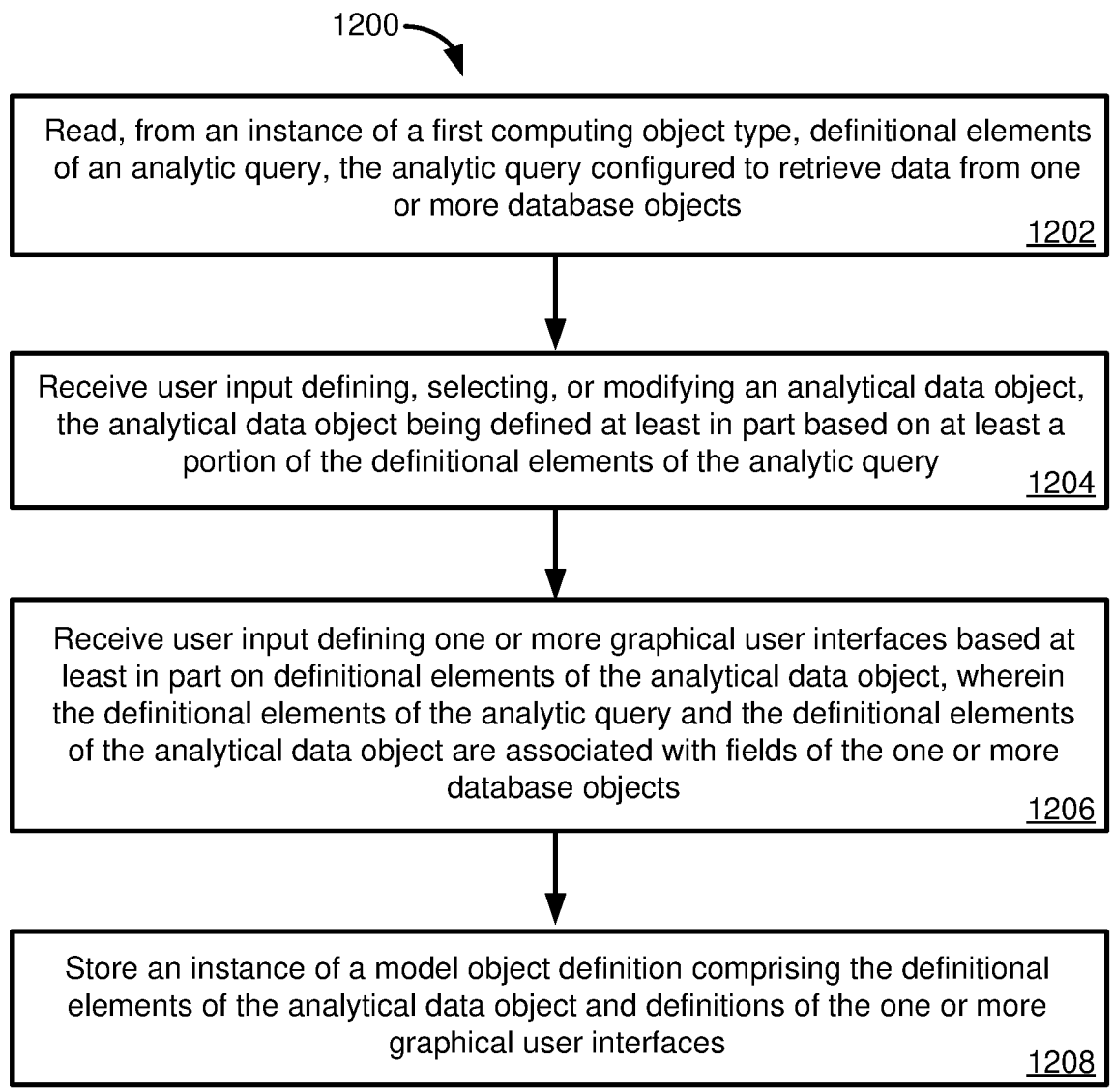
FIG. 12A is a flowchart of a process of defining a data model object instance representing a collection of graphical user interface displays.
Figure 12B:
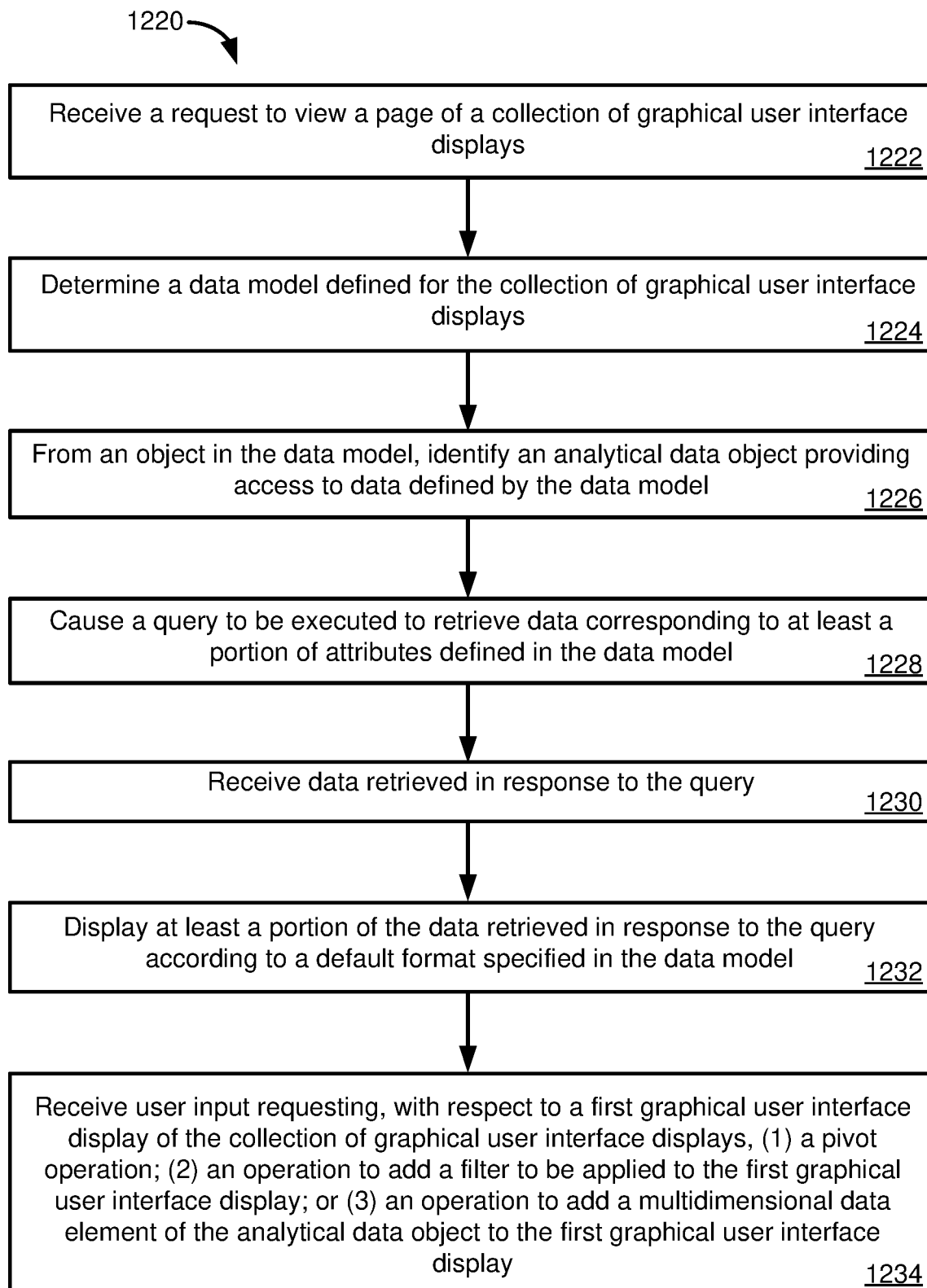
FIG. 12B is a flowchart of a process of displaying a graphical user interface display of an instance of a data model object representing a collection of graphical user interface displays.
Figure 12C:
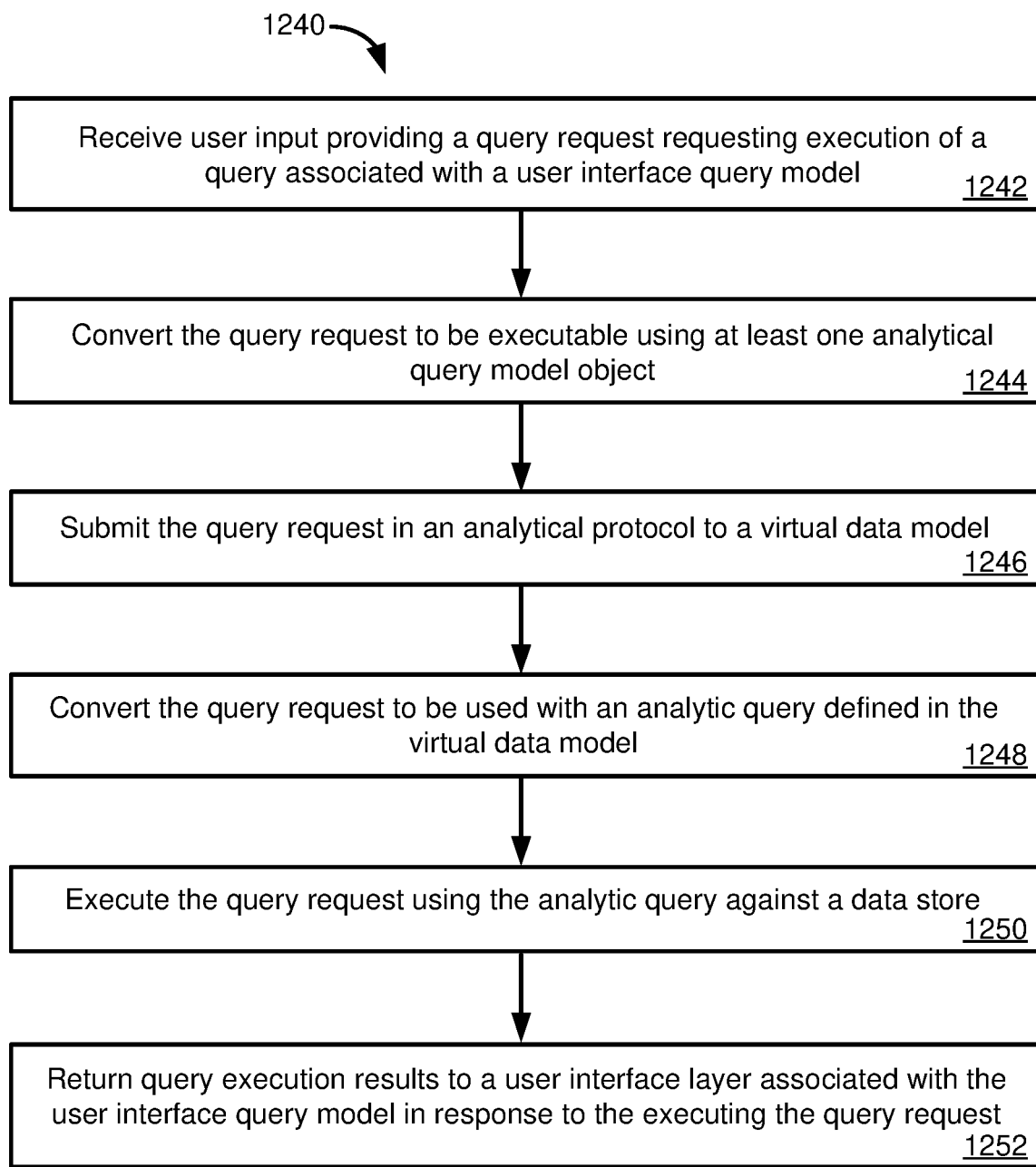
FIG. 12C is a flowchart of a disclosed technique of processing of query requests using a user interface query model using an analytical protocol and an analytic query.

FIGS. 12A-12C are flowcharts of example processes 1200, 1220, 1240 of, respectively, defining a data model object instance representing a collection of graphical user interface displays, displaying a graphical user interface display of an instance of a data model object representing a collection of graphical user interface displays, and processing query requests using a user interface query model using an analytical protocol and an analytic query.

Referring first to the process 1200 of FIG. 12A, at 1202, from an instance of a first computing object type, definitional elements of an analytic query are read. The analytic query is configured to retrieve data from one or more database objects. User input is received at 1204 that defines, selects, or modifies an analytical data object, the analytical data object being defined at least in part based on at least a portion of the definitional elements of the analytic query. At 1206, user input is received defining one or more graphical user interfaces based at least in part on definitional elements of the analytical data object. The definitional elements of the analytic query and the definitional elements of the analytical data object are associated with fields of the one or more database objects. An instance of a model object definition including the definitional elements of the analytical data object and definitions of the one or more graphical user interfaces is stored at 1208.

Turning to the process 1220 of FIG. 12, a request is received at 1222 to view a page of a collection of graphical user interface displays. A data model defined for the collection of graphical user interface displays is determined at 1224. At 1226, from an object in the data model, an analytical data object providing access to data defined by the data model is identified. A query is caused to be executed at 1228 to retrieve data corresponding to at least a portion of attributes defined in the data model. Data retrieved in response to the query is received at 1230. At 1232, at least a portion of the data retrieved in response to the query is displayed according to a default format specified in the data model. At 1234, user input is received requesting, with respect to a first graphical user interface display of the collection of graphical user interface displays, (1) a pivot operation; (2) an operation to add a filter to be applied to the first graphical user interface display; or (3) an operation to add a multidimensional data element of the analytical data object to the first graphical user interface display.

With reference to FIG. 12C and the process 1240, user input is received at 1242 providing a query request requesting execution of a query associated with a user interface query model. At 1244, the query request is converted to be executable using at least one analytical query model object. The query request is submitted in an analytical protocol to a virtual data model at 1246. At 1248, the query request is converted to be used with an analytic query defined in the virtual data model. The query request is executed at 1250 using the analytic query against a data store. Query execution results are returned at 1252 to a user interface layer associated with the user interface query model in response to the executing the query request.

Example 12—Computing Systems

Figure 13:
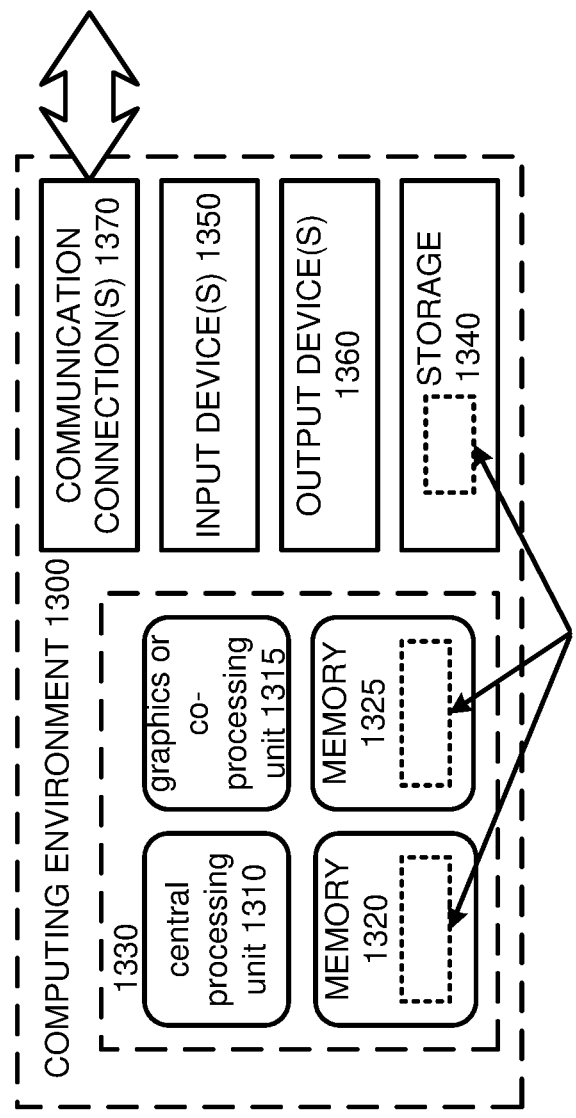
FIG. 13 is a diagram of an example computing system in which some described embodiments can be implemented.

FIG. 13 depicts a generalized example of a suitable computing system 1300 in which the described innovations may be implemented. The computing system 1300 is not intended to suggest any limitation as to scope of use or functionality of the present disclosure, as the innovations may be implemented in diverse general-purpose or special-purpose computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions, such as for implementing components of the processes of the present disclosure. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s) 1310, 1315. The memory 1320, 1325 stores software 1380 implementing one or more innovations described herein, in the form of computer-executable instructions suitable for execution by the processing unit(s) 1310, 1315. The memory 1320, 1325, may also store settings or settings characteristics, databases, data sets, interfaces, displays, object instances, or model.

A computing system 1300 may have additional features. For example, the computing system 1300 includes storage 1340, one or more input devices 1350, one or more output devices 1360, and one or more communication connections 1370. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information in a non-transitory way, and which can be accessed within the computing system 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing system 1300. The output device(s) 1360 may be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 13—Cloud Computing Environment

Figure 14:
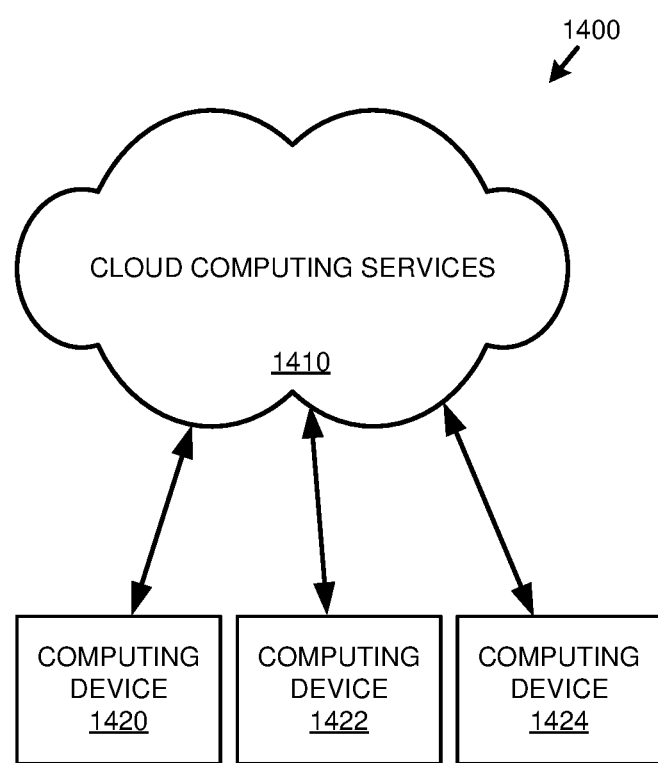
FIG. 14 is an example cloud computing environment that can be used in conjunction with the technologies described herein.

FIG. 14 depicts an example cloud computing environment 1400 in which the described technologies can be implemented. The cloud computing environment 1400 comprises cloud computing services 1410. The cloud computing services 1410 can comprise various types of cloud computing resources, such as computer servers, data storage repositories, networking resources, etc. The cloud computing services 1410 can be centrally located (e.g., provided by a data center of a business or organization) or distributed (e.g., provided by various computing resources located at different locations, such as different data centers and/or located in different cities or countries).

The cloud computing services 1410 are utilized by various types of computing devices (e.g., client computing devices), such as computing devices 1420, 1422, and 1424. For example, the computing devices (e.g., 1420, 1422, and 1424) can be computers (e.g., desktop or laptop computers), mobile devices (e.g., tablet computers or smart phones), or other types of computing devices. For example, the computing devices (e.g., 1420, 1422, and 1424) can utilize the cloud computing services 1410 to perform computing operations (e.g., data processing, data storage, and the like).

Example 14—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 13, computer-readable storage media include memory 1320 and 1325, and storage 1340. The term computer-readable storage media does not include signals and carrier waves. In addition, the term computer-readable storage media does not include communication connections (e.g., 1370).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP. SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor; and
   one or more computer-readable storage media storing computer-executable instructions that, when executed, cause the computing system to perform operations comprising:
   receiving a request to view a page of a collection of graphical user interface displays;
   determining a data model defined for the collection of graphical user interface displays;
   from an object in the data model, identifying an analytical data object providing access to data defined by the data model;
   causing a query to be executed to retrieve data corresponding to at least a portion of attributes defined in the data model;
   receiving data retrieved in response to the query;
   displaying at least a portion of the data retrieved in response to the query according to a default format specified in the data model; and
   receiving user input requesting, with respect to a first graphical user interface display of the collection of graphical user interface displays, (1) a pivot operation; (2) an operation to add a filter to be applied to the first graphical user interface display; or (3) an operation to add a multidimensional data element of the analytical data object to the first graphical user interface display.

2. The computing system of claim 1, wherein the user input requests a pivot operation, and the pivot operation causes a format of a data element of the first graphical user interface display to be converted between row and column formats.

3. The computing system of claim 2, wherein the pivot operation alters a default row/column assignment for the data element specified in the data model.

4. The computing system of claim 1, the operations further comprising:
   receiving a request to add a filter to a data set associated with the graphical user interface display;
   determining a plurality of data element types specified by the analytical data object; and
   rendering a display of at least a portion of the plurality of data element types specified by the analytical data object on the first graphical user interface display.

5. The computing system of claim 4, the operations further comprising:
   in response to user input selecting a data element type of the at least a portion of the plurality of data element types to provide a selected data element type, determining available filter values for the selected data element type;

displaying at least a portion of the available filter values on the first graphical user interface display;

receiving user input selecting at least one available filter value to provide at least one selected filter value; and filtering data displayed in the first graphical user interface display based at least in part on the at least one selected filter value.

6. The computing system of claim 1, the operations further comprising:

determining multidimensional elements of the data model;

displaying at least a portion of the multidimensional elements of the data model on the graphical user interface display;

receiving a selection of a displayed multidimensional element to provide a selected multidimensional element;

causing a query to be executed to retrieve data corresponding to the selected multidimensional element;

receiving query results comprising one or more data values for the selected multidimensional element; and displaying at least a portion of the one or more data values, or one or more data values derived at least in part from the one or more data values, in the first user interface display.

7. The computing system of claim 1, wherein a second graphical user interface display of the collection of graphical user interface, the second graphical user interface display being the first graphical user interface display or a graphical user interface display other than the first graphical user interface display, is displayed in a default layout specified in the data model, the operations further comprising:

receiving user input selecting a layout other than the default layout, providing a selected layout, and updating data presented the second graphical user interface display to conform with the selected layout.

8. The computing system of claim 1, wherein a second graphical user interface display of the collection of graphical user interfaces, the second graphical user interface display being the first graphical user interface display or a graphical user interface display other than the first graphical user interface display, displays data according to a first hierarchy specified in the data model, the operations further comprising:

receiving user input selecting a hierarchy other than the first hierarchy;

aggregating or disaggregating data presented in the second graphical user interface display according to the user input to provide updated data; and displaying the updated data in the second graphical user interface display.

9. The computing system of claim 8, wherein the user input selects a less aggregated hierarchy, the operations further comprising:

generating a query to request additional data to be used in the disaggregating.

10. The computing system of claim 9, wherein the query is submitted using the analytical data object.

11. The computing system of claim 1, the operations further comprising:

for a second graphical user interface display of the collection of graphical user interface displays, the second graphical user interface display being the first graphical user interface display or a graphical user interface display other than the first graphical user interface display, from the data model, determining at least one semantic style to be applied to data displayed in the second graphical user interface display.

12. The computing system of claim 1, wherein the user input requests addition of a multidimensional element of the analytical data object and the user input assigns the multidimensional element to be displayed in column format or in row format.

13. The computing system of claim 1, wherein the model is a booklet model that is an instance of a booklet model object type.

14. The computing system of claim 13, wherein values provided for the booklet model are not hardcoded.

15. The computing system of claim 1, wherein the analytical data object is defined with respect to an analytic query.

16. The computing system of claim 1, wherein causing a query to be executed comprises submitting the query to a query manager of an exposure layer.

17. The computing system of claim 16, wherein causing a query to be executed causes the exposure layer to convert a query request to an analytical data protocol.

18. The computing system of claim 17, wherein the query is a first query, the operations further comprising:

causing a second query to be executed, the second query being in a transactional data protocol.

19. A method, implemented in a computing system comprising at least one hardware processor and at least one memory coupled to the at least one hardware processor, the method comprising:

receiving a request to view a page of a collection of graphical user interface displays;

determining a data model defined for the collection of graphical user interface displays;

from an object in the data model, identifying an analytical data object providing access to data defined by the data model;

causing a query to be executed to retrieve data corresponding to at least a portion of attributes defined in the data model;

receiving data retrieved in response to the query;

displaying at least a portion of the data retrieved in response to the query according to a default format specified in the data model; and receiving user input requesting, with respect to a first graphical user interface display of the collection of graphical user interface displays, (1) a pivot operation; (2) an operation to add a filter to be applied to the first graphical user interface display; or (3) an operation to add a multidimensional data element of the analytical data object to the first graphical user interface display.

20. One or more non-transitory computer-readable storage media comprising:

computer-executable instructions that, when executed by a computing system comprising at least one hardware processor and at least one memory coupled to the at least one hardware process, cause the computing system to receive a request to view a page of a collection of graphical user interface displays;

computer-executable instructions that, when executed by the computing system, cause the computing system to determine a data model defined for the collection of graphical user interface displays;

computer-executable instructions that, when executed by the computing system, cause the computing system to, from an object in the data model, identify an analytical data object providing access to data defined by the data model;

computer-executable instructions that, when executed by the computing system, cause the computing system to cause a query to be executed to retrieve data corresponding to at least a portion of attributes defined in the data model;

computer-executable instructions that, when executed by the computing system, cause the computing system to receive data retrieved in response to the query;

computer-executable instructions that, when executed by the computing system, cause the computing system to display at least a portion of the data retrieved in response to the query according to a default format specified in the data model; and computer-executable instructions that, when executed by the computing system, cause the computing system to receive user input requesting, with respect to a first graphical user interface display of the collection of graphical user interface displays, (1) a pivot operation; (2) an operation to add a filter to be applied to the first graphical user interface display; or (3) an operation to add a multidimensional data element of the analytical data object to the first graphical user interface display.

* * * * *